United States Patent [19]

Braitberg et al.

[11] Patent Number: 5,535,274
[45] Date of Patent: Jul. 9, 1996

[54] UNIVERSAL CONNECTION FOR CELLULAR TELEPHONE INTERFACE

[75] Inventors: Michael F. Braitberg; Patrick J. Kennedy; Lester B. Hatcher; Davide Andrea; Gregory D. Volan, all of Boulder, Colo.

[73] Assignee: Cellport Labs, Inc., Boulder, Colo.

[21] Appl. No.: 229,956

[22] Filed: Apr. 19, 1994

Related U.S. Application Data

[63] Continuation-in-part of Ser. No. 773,840, Oct. 9, 1991, Pat. No. 5,333,177.

[51] Int. Cl.$^6$ .................................................. H04M 1/00
[52] U.S. Cl. ........................ 379/446; 379/455; 379/454; 379/426
[58] Field of Search .................................. 379/445, 454, 379/455, 446, 426, 59, 63; 655/89, 90; 248/224.1, 223.4, 224.2, 221.3, 222.1

[56] References Cited

U.S. PATENT DOCUMENTS

| | | | |
|---|---|---|---|
| 4,718,080 | 1/1988 | Serrano et al. | 379/59 |
| 4,782,526 | 11/1988 | Uchino et al. | 379/445 |
| 4,792,986 | 12/1988 | Garner et al. | 455/89 |
| 5,081,667 | 1/1992 | Drori et al. | 379/59 |
| 5,127,041 | 6/1992 | O'Sullivan | 379/63 |
| 5,189,358 | 2/1993 | Tomura et al. | 455/89 |

OTHER PUBLICATIONS

Morrison A. Dempsey Communications, "AB3X Cellular Interface" Owner's Manual, Nov. 1987, 30 pages.

*Primary Examiner*—Jeffery Hofsass
*Assistant Examiner*—Jack Chiang
*Attorney, Agent, or Firm*—Sheridan Ross & McIntosh

[57] ABSTRACT

A cellular telephone is interconnected to a host assembly via a cable. The cable contains both appropriate interdisciplinary connections for attachment to the telephone at one end and to the host assembly at the other end via a universal connector. The identity of the particular cellular telephone can be provided to the host assembly by a number of different protocols including the downloading of function-related parameters to the host assembly that are unique to the particular telephone. Accordingly the host assembly can function with any one of a variety of cellular telephones having differently configured cable connections. In one embodiment, a pocket adapter holds the cellular telephone and includes the universal connector.

19 Claims, 19 Drawing Sheets

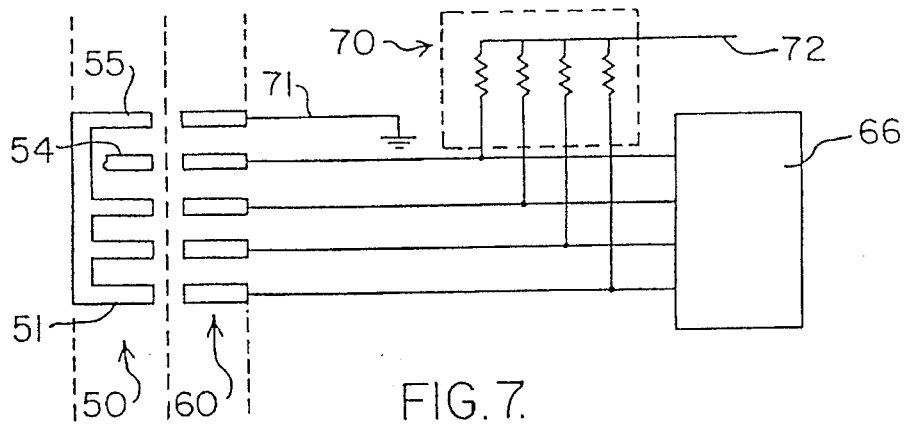
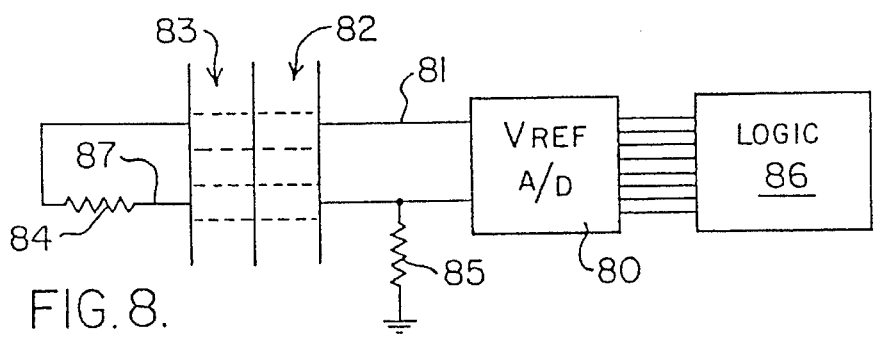
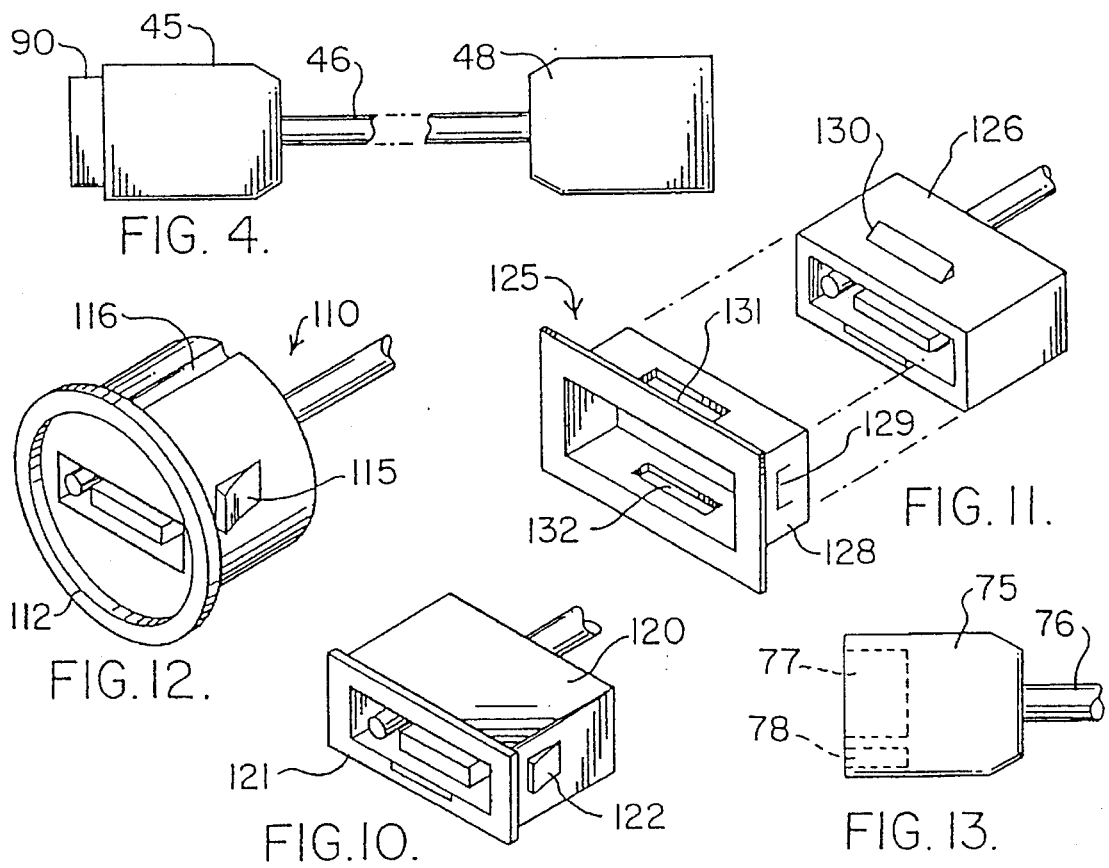

UNIVERSAL CONNECTION FOR CELLULAR TELEPHONE INTERFACE

RELATED APPLICATIONS

This application is a continuation in part of U.S. patent application Ser. No. 07/773,840 filed Oct. 9, 1991, now Pat. No. 5,333,177 entitled "UNIVERSAL CONNECTION FOR CELLULAR TELEPHONE INTERFACE."

FIELD OF THE INVENTION

The present invention relates generally to cellular telephone interfacing systems and processes. More particularly, the present invention relates to an apparatus for providing a communications interface between a cellular telephone, selected from a variety of such telephones, to a common base unit.

BACKGROUND OF THE INVENTION

Cellular telephone systems have gained widespread acceptance as an efficient means of mobile voice and data communications. While early mobile units were large and complex, miniaturization has made possible hand-held units with full functional capabilities allowing the user freedom to use the phone unit without connection to the vehicle. Unfortunately, this miniaturization has made hand-held units less practical for vehicular use. For example, battery charging, remote antenna connections, voice and data communications, and most importantly, what is known as "hands free" operation require a physical connection between the phone unit and parts or devices found in the vehicle.

To solve this problem cellular phone manufacturers have made available car kits to provide the required features. These kits include physical hardware to retain the phone in the vehicle including an attachment for establishing an electrical connection to the phone and various types of remote speakers, microphones and antenna connections. These kits also include complex electronics modules to provide battery charging, audio amplification and digital communication interface to the phone unit.

There are a large number of models of cellular telephones in existence and each physical interconnection and electrical interface is unique to a manufacturers specific model. There are many examples of presently used physical interconnections. As a result, car kits do not provide any form of universal connection and are neither physically nor electrically interchangeable. Further, because of the large variety and relatively low volume production of these kits, users are forced to pay prices comparable to the much more complex phone unit itself to obtain these kits.

This situation has caused a hardship on cellular telephone users and affected the marketplace for new equipment. Fleet users, for example, cannot provide a universal car kit connection for the variety of phones they may acquire. Users are forced to abandon their investment in the car kit when purchasing new models of telephones. These limitations have prevented businesses such as car rental agencies from providing users with means to use their car phones in rented vehicles. Further, the high cost of these car kits has caused many users to operate hand-held units while driving, an unsafe condition which is subject to increasing governmental concern and regulation.

SUMMARY OF THE INVENTION

One object of the present invention is to provide a universal physical and electrical connection to a plurality of different kinds of hand-held cellular telephone units. In one embodiment, a selectable adapter cable coding permits determination of the unique identity of the type of attached phone thereby allowing a data processing unit or the like to establish appropriate electrical interfacing support operations. A further purpose of the invention is to provide means to interface with a large number of hand-held and portable phones to achieve low cost electrical adapters that are useful with many makes and models of phones.

One embodiment of the present invention provides a universal interface with a cable having on a first end a multiple contact connector of a predetermined number of connectors in a predetermined configuration and contact assignment discipline. At least one of the first end connectors is adapted for presenting a coded signal. That coding signal identifies at least the type of cellular phone attached to the connector on the opposite end of the cable. An arrangement is coupled to the coded signal connector for determining the type of cellular phone attached to the opposite end connector of the cable. Once the phone identification is determined, the system enables the cable first end connector contacts for performing functional operations with the cellular telephone attached to the cable.

The coded signal correlates to the identity of a particular type of cellular telephone. Information for controlling the cable first end connector for functionally operating with a particular one of a plurality of cellular telephones is retrievably stored as a multiplicity of information groups. Each such group is selectable in accordance with the coded signal. This makes it possible to respond to a received coded signal for selecting the information group identified thereby from storage and for using that group to enable appropriate interfacing with the cellular telephone through the cable connectors.

An apparatus for providing a universal interface with a hand held cellular telephone can include a cable with first and second connectors. The first connector is attached to one end of the cable and includes contacts for the production of battery charging power as well as for exchanging radio frequency, audio and digital signals. It can also include structure to identify the make and model of the cellular telephone independently of that telephone. The second connector is attached to the opposite end of the cable. It includes contacts for allowing attachment to a predetermined one of a plurality of different types of cellular telephone units. The cable further includes a plurality of conductors which interconnect the first and second connector contacts that have common or corresponding functions. As a result, a universal interface is establishable between a host assembly which provides signal processing features with a predetermined cellular telephone amongst the variety of different cellular telephones that are available.

A second embodiment of the present invention preferably provides a communications interface between at least one of a plurality of cellular telephones and a common base unit for providing a number of functions associated with cellular telephones. This embodiment preferably includes at least a first pocket device having a connector housing for establishing a physical and electrical connection with a cellular telephone and further having an electrical interface for establishing an electrical connection with a common base unit. Flexible electrical conductors are provided for establishing an interconnection between the connector housing and the electrical interface. A common connector is connected to the electrical interface and provides a standard physical and electrical configuration for the interface. A communications assembly, such as an electrically conductive cable, interconnects the common base unit and the common connector to establish a communication path therebetween.

The first pocket device also preferably includes an identifier unit for providing information related to the identity of the cellular telephone to which the first pocket device is connected. The identifier unit preferably includes a non-volatile ROM or other memory device for storing information and a communications port for communicating identifying information to the common base unit. Based on the identifying information, the common base unit may establish a plurality of operating parameters for use with the cellular telephone connected to the first pocket device.

Those having normal skill in the art will recognize the foregoing and other objects, features, advantages and applications of the present invention from the following more detailed description of the preferred embodiments as illustrated in the accompanying drawings.

BRIEF DESCRIPTION OF THE DRAWINGS

FIG. 4 is an exemplary embodiment of an adapter cable in accordance with a first embodiment of the present invention;

FIG. 7 is a diagram of an embodiment in accordance with this invention for identifying the adapter interface connector;

FIG. 8 is a partially schematic diagram of another embodiment of this invention for identifying the adapter cable by selectable resistor means;

FIG. 10 shows a configuration of a cable connector mounting suitable for attachment to a panel, dashboard, bulkhead or the like;

FIG. 11 is another configuration of a cable connector mounting suitable for a panel type attachment;

FIG. 12 is an arrangement for a cable connector mounting as a replacement for a vehicle cigarette lighter;

FIG. 13 is an illustration of a female connector for adapting the FIG. 4 cable as an extension;

DETAILED DESCRIPTION

The present invention is described below with emphasis on automobile applications and environments. However, the invention is not restricted to a particular type of vehicle application, but is suited for use in any type of environment including all types of vehicles, as well as in buildings and anywhere portable communication units are operational.

Further, though the present invention is described below with reference to a hand-held portable cellular telephone, it is recognized that the present invention may be used with any one-way or two-way radio designed to work on any type of wireless radio network. Such networks may include analog mobile cellular telephone networks (Advanced Mobile Phone Service, or AMPS), dual-mode analog/digital mobile cellular telephone networks, purely digital mobile cellular telephone networks, or any of a range of other types of networks using cellular and other technologies. Other cellular-like services may include personal communications services (PCs) and satellite-based mobile radio networks such as those proposed before the FCC as low-earth-orbit (LEO) systems. Other types of radio system that these inventions pertain to include, but are not limited to, geosynchronous satellite systems such as that planned by the American Mobile Satellite Corporation and Telestat Canada, as well as conventional terrestrial mobile radio systems, Specialized Mobile Radio (SMR) systems adapted for digital data transmission, Enhanced SMR systems, and carrier-provided mobile services such as paging services, the IBM/Motorola ARDIS network, RAM Mobile Data, and any other commercial radio service.

Figure 1:
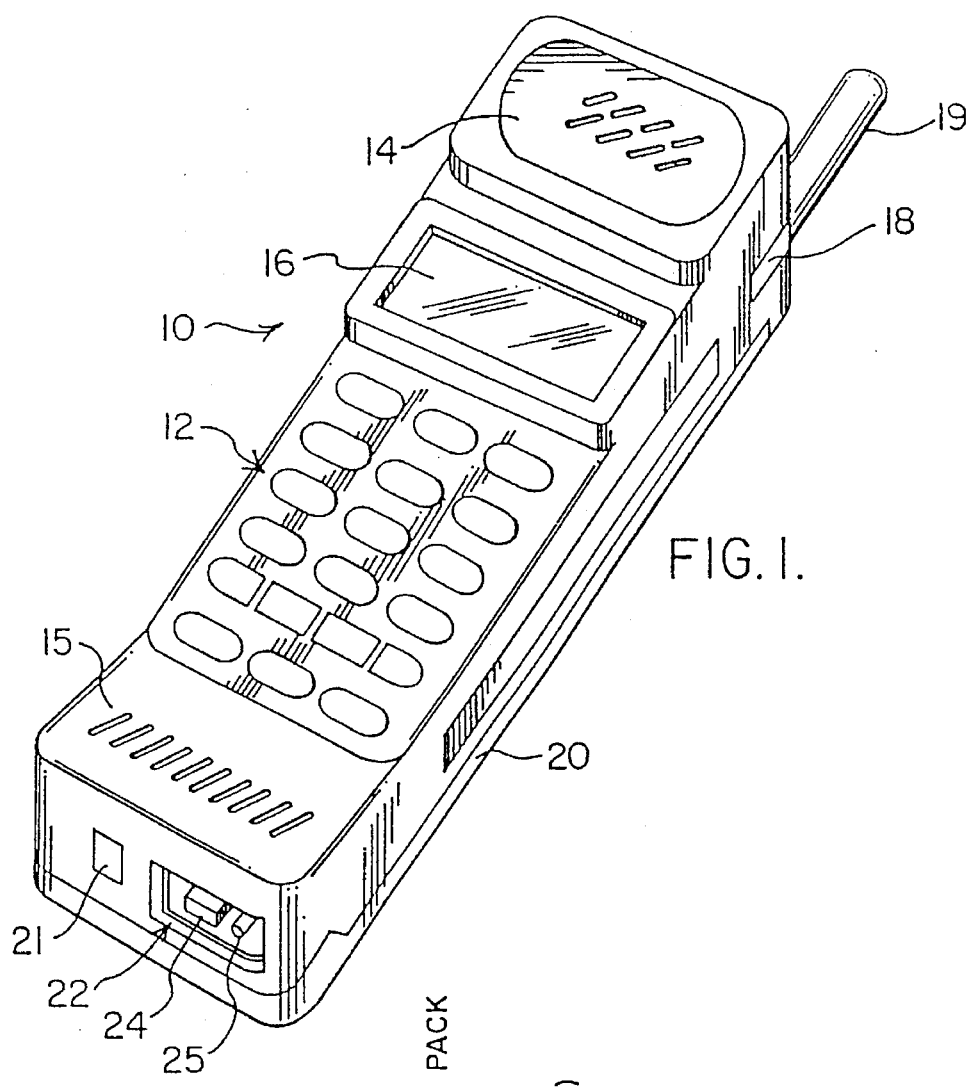
FIG. 1 shows a contemporary cellular telephone and its interconnection port.

Hand-held cellular telephones, such as unit 10 illustrated in FIG. 1, employ a wide variety of physical interfaces. There are a large number of models of cellular telephones in existence and each physical interconnection and electrical interface is unique to a manufacturers specific model.

Cellular phone 10 includes a typical array of features for such devices. Keypad 12 allows dialing and other data processing/generating functions. An earphone 14 is positioned at one end while a microphone/speaker 15 is located at the other end. Liquid crystal display (LCD) 16 provides a compact presentation of limited information to the user while switch 18 is for on/off control. Antenna 19 communicates with the base unit for the phone 10 when it is removed from its holder. A battery pack 20 is attached to the lower portion of phone 10 and requires periodic recharging when unit 10 is placed in the base unit (not shown). It is released for detachment by manual button 21.

Interconnections with the base unit are established by a plug 22 at one end of unit 10. The particular connector of FIG. 1 is a male connection with a center extension 24 having arrays of electrical contacts on the upper and lower surfaces thereof. Additionally, an RF coaxial type element 25 is included as a portion of plug 22. Note that not every cellular telephone has an RF connector even though one is included in the example shown as element 25. In conventional use, unit 10 is stored in the base unit so as to couple plug 22 with a complementary connector in the base unit.

FIGS. 2A through 2F show a series of examples of presently used physical interconnections for cellular telephones. That is, FIGS. 2A to 2F present typical examples of cylindrical, rectangular, spring contact and pad type connections used in common cellular phone units, usually in the base plate thereof. From this it is apparent the wide range of configurations and physical sizes prohibits a common interconnection to a base unit or the like. Cellular phones are expected to use even smaller connectors as the units are further miniaturized in the future.

Figure 3:
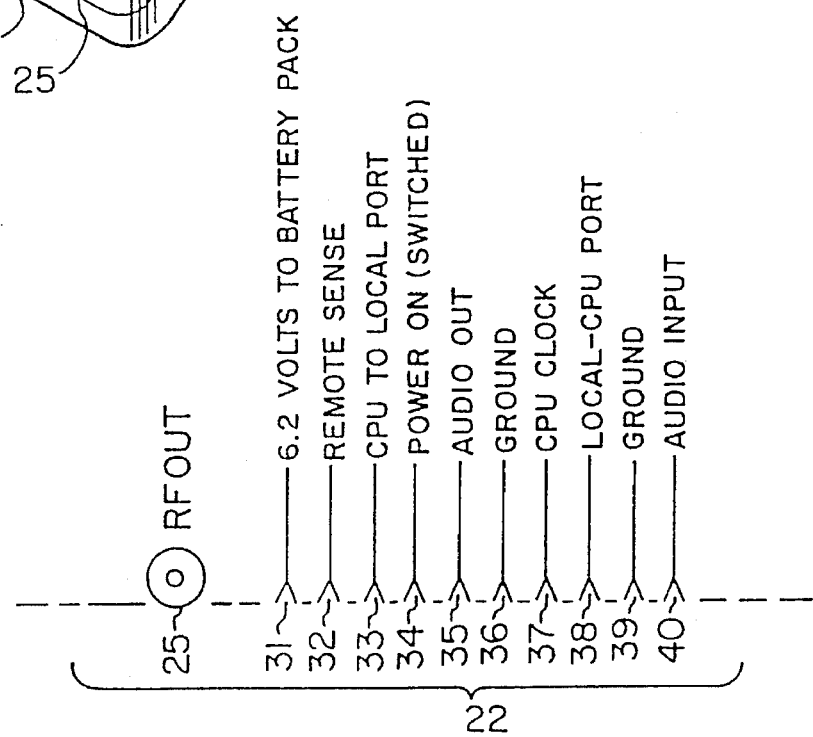
FIG. 3 is a tabulation of the electrical functions associated with a typical input/output connector for a contemporary cellular telephone.
Figure 2A:
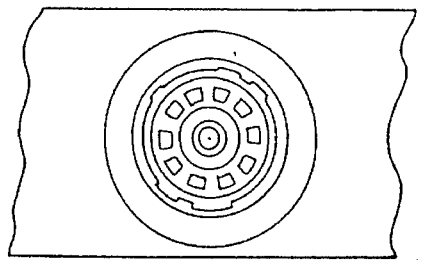
FIGS. 2A to 2F show examples of a variety of hand-held cellular telephone input/output physical interfaces.
Figure 2D:
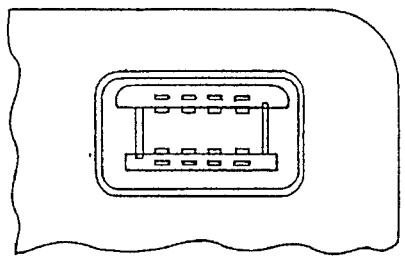
Figure 2B:
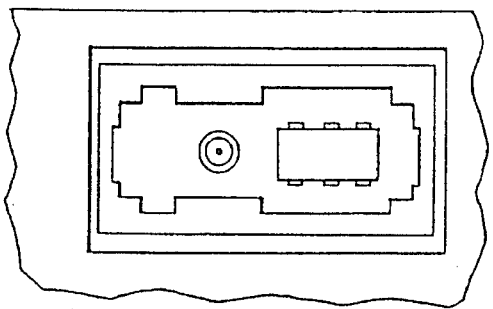
Figure 2E:
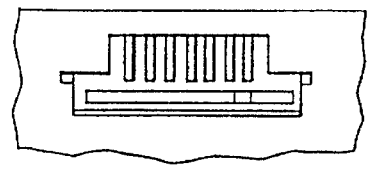
Figure 2C:
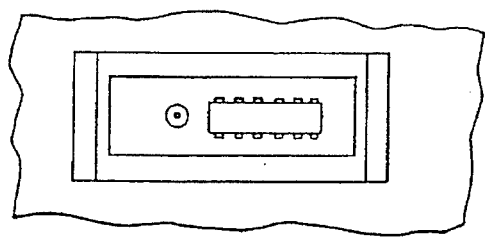
Figure 2F:
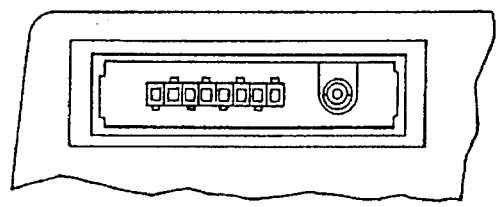

Electrical interfaces to the various phone units present still more problems. For instance, there is a wide variety of battery types and voltages used in the rechargeable battery packs incorporated into the phone units. Further, the electrical phone signals exist in a wide variety of voltage levels and signal coding schemes. A typical example of the functions assigned to the pins of a conventional phone input/output connector 22 containing connector contacts or pins 31–40 is shown in FIG. 3. Note that connector 22 of FIG. 3 might or might not represent the specific pin function assignments for connector 22 shown in FIG. 1. While there is a certain amount of commonality of functions associated with many cellular phones, the particular function assigned to a given pin often varies as does the number of functions, the number of pins and their physical configurations.

Connector 22 is shown with a coaxial connector 25 to provide for direct connection to the RF output. Pin 31 is used for battery charging from the remote adapter, while pin 32 is used to detect the presence of the remote adapter and pin 33 is used for digital communication to the remote adapter. Pin 34 is used to signal the remote adapter that phone power is on. Pin 35 has the low level audio output signal to drive a remote speaker amplifier. Pins 36 and 39 provide internal ground connections. Pin 37 provides the CPU clock signal, pin 38 is the local to CPU communications port, and pin 40 is used to receive the signal from the remote microphone.

Figure 5:
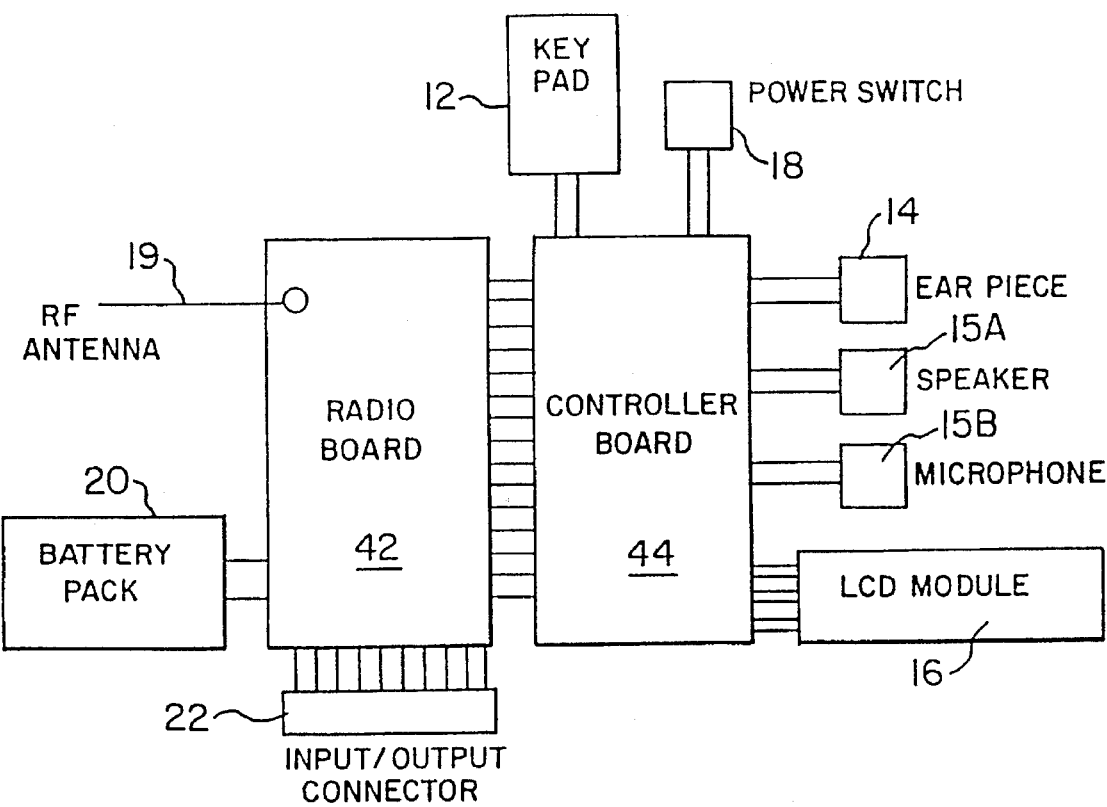
FIG. 5 is a block diagram of a typical hand-held cellular phone unit.

The internal architecture of a typical phone unit is shown in block diagram form in FIG. 5 where further details of the interconnections with the internal block functions of the phone with the input/output connector 22 described above are presented. The peripheral elements of FIG. 5 correspond to their counterparts of FIG. 1. Note that the speaker 15A is separate from the microphone 15B but both are housed at that end of unit 10. This is to prevent production of the ringing sound directly into the ear of the user. Radio board 42 contains the radio frequency signal handling components whereas a computer including a conventional CPU with its input/output interfaces is contained in board 44. The CPU of board 44 handles all the host functions associated with the components shown.

It is possible to create a custom tailored adapter cable configured internally to transpose connections between the various interconnection disciplines along the lines of those shown in FIG. 2. The present invention in part contemplates creation of an adapter cable with a universal interface as a common connector at one end but with that cable provided with a suitable connector at the other end to attach to a particular connector configured to another contact assignment discipline. The present invention further contemplates the creation of a plurality of pocket adapter devices, each pocket adapter device being adapted to establish a physical and electrical interconnection between a particular model of cellular telephone and a common base unit. To accomplish this goal, two major problems are solved. First, a suitable connector is designed so that any phone unit may be accommodated regardless of electrical interface. Second, a manner of identifying is provided to determine exactly what phone unit is connected to the adapter cable so that the electronic interface can properly adapt to that phone.

A suitable connector must meet several conflicting requirements. An acceptable connector system must be low cost, allow a variety of mounting arrangements and have characteristics suitable for its intended operating environment such as for use not only in automobiles but also in vehicles, boats, tractors, residences, and so forth. Often the operating environment demands shielding of the cable and connector as protection against interference with other equipment that is interference signal sensitive as well as to protect the phone system from interference signals. Such a connector and adapter cable system is shown in FIG. 4 and described below.

A universal connector 45 or plug is arranged in accordance with a predetermined assignment of pin functions. On the opposite end of cable 46 is a connector or plug 48 configured to attach to a particular cellular phone such as one of those illustrated in FIGS. 2A–2F. That is, connector 48 is different for each differently configured connector on a cellular phone. The conductors within cable 46 are connected within plugs 45 and 48 so that the pin functions are matched. As is likewise described in greater detail below, in one embodiment, connector 45 can include an arrangement for providing a signal to the using device, host or base unit attached to plug 45 wherein the signal is encoded to identify the kind of cellular phone plugged into connector 48 at the other end of cable 46.

Figure 9:
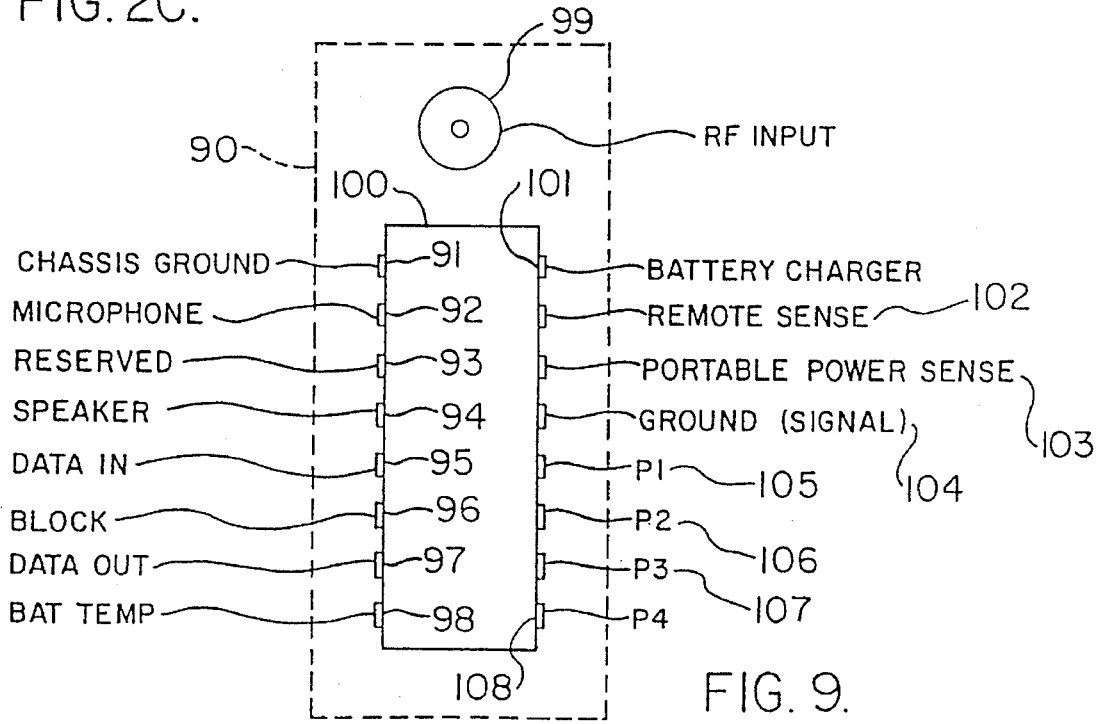
FIG. 9 is a tabulation of an exemplary connection assignment discipline for use in conjunction with the present invention.

One example of a suitable connector for providing a standard interface connection, as for the FIG. 4 cable, is illustrated in FIG. 9. This connector is preferably panel mounted and consists of a protective hood 90 protecting a rectangular center block 100 of insulating material with parallel rows of contacts. Each row preferably has eight gold plated, substantially flat contacts 91–98 and 101–108. These contacts are formed slightly convex in order to create miniature leaf springs which provide pressure with the contacts of the mating connector. Thus the interface to the mating connectors is such that they are self-cleaning by means of the self wiping action during insertion. This is an especially important consideration in automobile applications.

Note that, if desired, hood 90 could provide a shield against outside signals interfering with the cable signals or, conversely, against signals in cable 46 from interfering with other equipments. This is possible by electrically connecting hood 90 to a sleeve type RF shield encasing the main body of cable 46 and a similar shielding hood at the opposite end connector 48.

The contact pins 91–98 and 101–108 are arrayed along each side of block 100 with the tubular, coaxial radio frequency (RF) connector 99 located in spaced relation towards one end. A typical such connector 99 is 0.10 inches in diameter with low standing wave ratio at frequencies of 800 to 900 MHz suitable for attachment to a coaxial cable. Connections to the contacts are conventional as by soldering, crimping or the like. The center block 100 and RF connector 99 are recessed in a rectangular shell 90 to provide protection from physical damage. The mating connector has the same characteristics with the housing designed to provide protection cable strain relief and a locking mechanism to provide secure engagement but allow easy removal.

Assuming connector 45 of FIG. 4 is arranged in accordance with FIG. 9 whereas connector 48 on the opposite end of cable 46 is configured pursuant to the FIG. 3 discipline, the conductors through cable 46 would interconnect the pins at each plug which have comparable functions. A coaxial cable would thus couple RF plug 25 with RF plug 99. Conductors would also interconnect battery pin 31 with charger pin 101, both pins 36 and 39 with ground pin 91, clock pin 37 with pin 96, pin 35 with pin 92, and pin 40 with pin 94. Further, pin 34 is connected with pin 103 while pin 32 is interconnected with pin 102. Finally pin 33 is coupled to pin 97 while pin 38 goes to pin 95 as does pin 35.

If one of the grounds at pins 36 and 39 of FIG. 3 is a signal ground rather than chassis ground, that particular pin might connect with pin 104. In the standard established by FIG. 9, pins 105–108 identified as P1–P4 are employed for device identification purposes as is described in detail in FIGS. 6, 7 and 8. Note that the FIG. 9 connector has a battery temperature sensor input terminal 98. This is to accommodate cellular phones that include such a sensor output even though the FIG. 3 connector does not include this function. When the control device attached to plug 90 senses the model type identification from terminals 105–108, it would realize that the phone model involved here does not have a battery temperature sensing signal and would ignore pin 98. Otherwise the controller adjusts its interconnections and support functioning for terminals 91–98 and 101–104 to fully cooperate with the phone connected via appropriate conductors to the other end of the cable from connector 90.

FIG. 10 shows connector 120, a snap-in bulkhead mounting version, that mates with the adapter cable. Installed from the front of the panel in a rectangular cut out, a trim bezel 121 forms a front panel mounting surface. As is common practice, molded clips such as 122 allow easy insertion but expand and lock against the rear surface of the panel retaining the connector body while accommodating a range of panel thickness. This and the following version are useful for original equipment automobile installation.

Assembly 125 of FIG. 11 is somewhat similar to FIG. 10 but is designed for either front or rear insertion of connector 126. For example, a bezel assembly 128 includes snap-mount retaining clips such as 129 to hold assembly 128 in a panel opening similar to the FIG. 10 clips as described above. Assembly 128 acts as a receiver for connector body 126 which in this example has snap tongues such as 130 on the upper and lower surfaces which engage respective slots such as slots 131 and 132 in the bezel assembly 128. Rear mounting is desirable in some cases where the cable is permanently affixed to an electronics module for example. Many variations of this and the previous mounting method are possible to provide easier installation and lower product cost. For instance, it is possible to integrate the bezel with the dashboard fascia molding eliminating or modifying elements of the mounting method.

FIG. 12 illustrates a connector 110 that mates with the adapter cable. This version resides in a housing 112 designed in a manner identical to the common automotive cigarette lighter assembly which is approximately ⅞ inches in diameter. It can include means to secure it to the panel such as retaining tabs 115 and a locating groove 116 especially if it is removable. Installation is accomplished by replacing the existing lighter assembly without requiring permanent modification to the vehicle. If necessary the original lighter assembly can be re-installed at some future time to restore the vehicles to its original condition. This version is useful in an aftermarket installation kit.

FIG. 13 is a mating cable end to the adapter cable used when it is desired to provide an extension cable or to allow a variety of mounting methods which may attach directly to the connector or cable body. That is, connector 75 is attached to cable 76 which corresponds to cable 46 of FIG. 4. The connector on the other end of cable 76, although not shown in FIG. 13, is the same as connector 45 of FIG. 4. Receiving female connector elements 77 and 78 are thus compatible with attachment to a male connector constructed the same as plug 45.

One embodiment for determining the make and model of the phone employs a cable adapter to identify itself to the electronics module or host assembly 150. This is accomplished in the FIGS. 6A–6D configuration by a number of pins reserved at the processor or common end of the cable connector for use as a programming device. An electrically conductive structure 50 containing a plurality of physically and electrically interconnected pins 51–55 is inserted into and retained by connector body 58 as seen in FIG. 6B. A short connecting link 56 extends above ridge or shoulder 57 above the connector body 58 when connector 50 is inserted therein. These links are preferably clipped in a binary pattern to produce the identification data for the processor 154 so that it can determine the type of cellular phone attached to the other end of the cable.

Figure 6A:
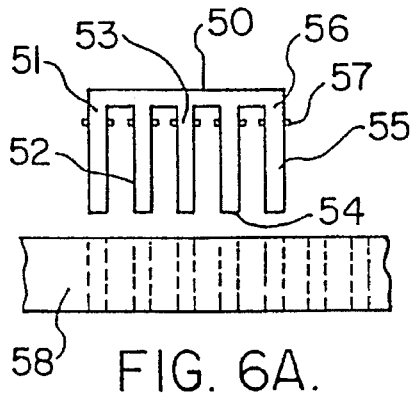
FIGS. 6A to 6D illustrate one method of embodying a coded adapter cable connector in accordance with this invention.
Figure 6C:
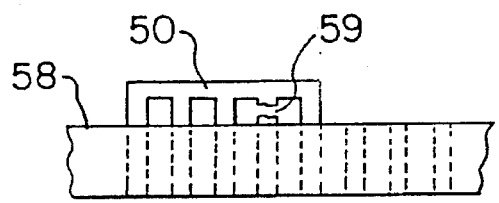
Figure 6B:
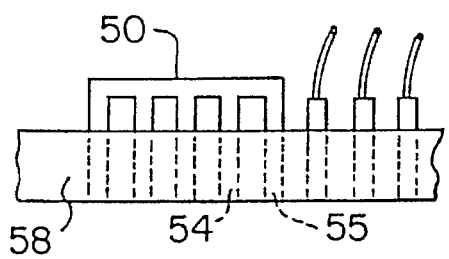
Figure 6D:
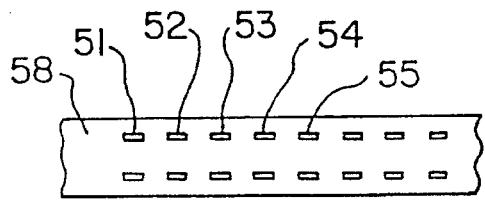

For example, if link 54 is clipped as shown as gap 59 in FIG. 6C, the resulting circuit to pin 54 is opened. Thus electrical current sensing of the pins 51–55 in FIG. 6D will reflect the open circuit status of pin 54. The connector body 58 includes conventional, well-known means (not shown) for retaining the end of the clipped contact in place so as to prevent it from falling out or sliding back into the connector body when the connectors are coupled.

If pin 55 is considered a common bus and is connected to circuit common receiver 60 as shown in FIG. 7, then decode logic circuitry 66 can establish a voltage at the mating connector 60 by means of a resistor network 70 connected to the digital logic supply voltage 72. For this example, assume pin 51 represents the most significant bit and in sequence pin 54 represents the least significant bit. Thus the digital pattern 0001 is detectable at the mating connector 60 by the decode logic 66. The connector 50 configuration thereby allows detection of a total of 16 different identification codes or 32 if system ground (91 or 104) is used. The use of additional connector pins can substantially increase the number of available unique codes. If desired, it is possible to generate the digital or analog identification codes at the cellular phone or its connector. However, this requires circuit complexity and additional conductors through the cable which is avoided by incorporation of the code generation in the universal connector as described herein.

In a typical system configuration, a computer is part of the host assembly although hard wired control units or other combinations of electronic elements are acceptable. The control unit or computer stores a series of blocks of data in a memory or other data storage device with each block containing the instructions necessary for controlling the universal connector interfacing circuits to operate through the universal connector into a particular type of cellular telephone. The blocks of data are each retrievable from the data storage device in accordance with the identification code presented to the computer on the universal connector. The controlling device uses the retrieved data to set up a compatible set of switches, voltage levels, signal paths, etc., at the host system universal connector interface to work with the kind of cellular telephone specified by the identification data. The system likewise is controlled to establish normal operations with the attached cellular telephone thereafter. The system is ready to function whenever a cellular telephone is connected to one end of a cable with the other end attached to the host system universal connector input port.

In a typical operation, the decoding device in the host assembly samples the universal connector 50 pin connections which are specified as the source of code signals for identification of the type of connector and/or telephone present on the other end of the cable. The processor does this by decoding the binary identification number from those pins. The processor actually identifies the type of phone via a table look-up operation. Once having determined the cellular phone type, the processor next establishes the necessary interfacing voltages, signal protocols and interconnections to allow the base unit to communicate with the phone in an appropriate manner compatible with the type of phone attached.

Yet another embodiment for providing coding is shown in FIG. 8. In this embodiment, analog to digital (A/D) converter 80 provides a reference voltage (Vref) to line 81 which is presented to the mating connector pins 82 and 83. The voltage produces a current through the circuit consisting of resistor 84 (Rprog) and resistor 85 (Rfixed) in a half-bridge configuration providing a voltage at pin 87 which is connected to the signal input of A/D converter 80. A 6 bit A/D converter can provide 64 possible binary codes to logic 86. The value for each Rprog resistor 84 is calculated from the equation: Vout*Rfixed/(Vref-Vout). An example of this calculation is shown in appended Table 1 wherein Rprog is a list of programming resistor values which uniquely determine one of the 64 possible input voltages to the D/A converter 80 which result in distinct binary output codes. Rfixed is the half-bridge calibrating resistor 85 and Vref is present on line 81. In Table I, Vref is 5.0 volts, Rfix is 100k ohms, "Hex" is a hexadecimal address and the Rprog terms such as "1.43E+03" means, a resistive value in ohms computed by 1.43 times 10 to the third power (or 1000).

Yet another version of the previously discussed apparatus and methods is to use a plurality of programming resistors with one end connected in common to Vref and a like number of A/D converters. This can provide a large expansion in the number of identification bits or allow the use of less expensive A/D converters having fewer conversion bits.

A second embodiment of the present invention, illustrated in FIGS. 14–31, includes a common base unit for mounting in an automobile. The base unit is able to be selectably connected to each one of a plurality of pocket adapters or devices to achieve desired communications between the cellular telephone and the common base unit. This embodiment allows cellular telephone users to interconnect various models of cellular telephones to the common base unit using the particular, selected pocket adapter that properly provides a communications interface between the cellular telephone and the common base unit.

Figure 14:
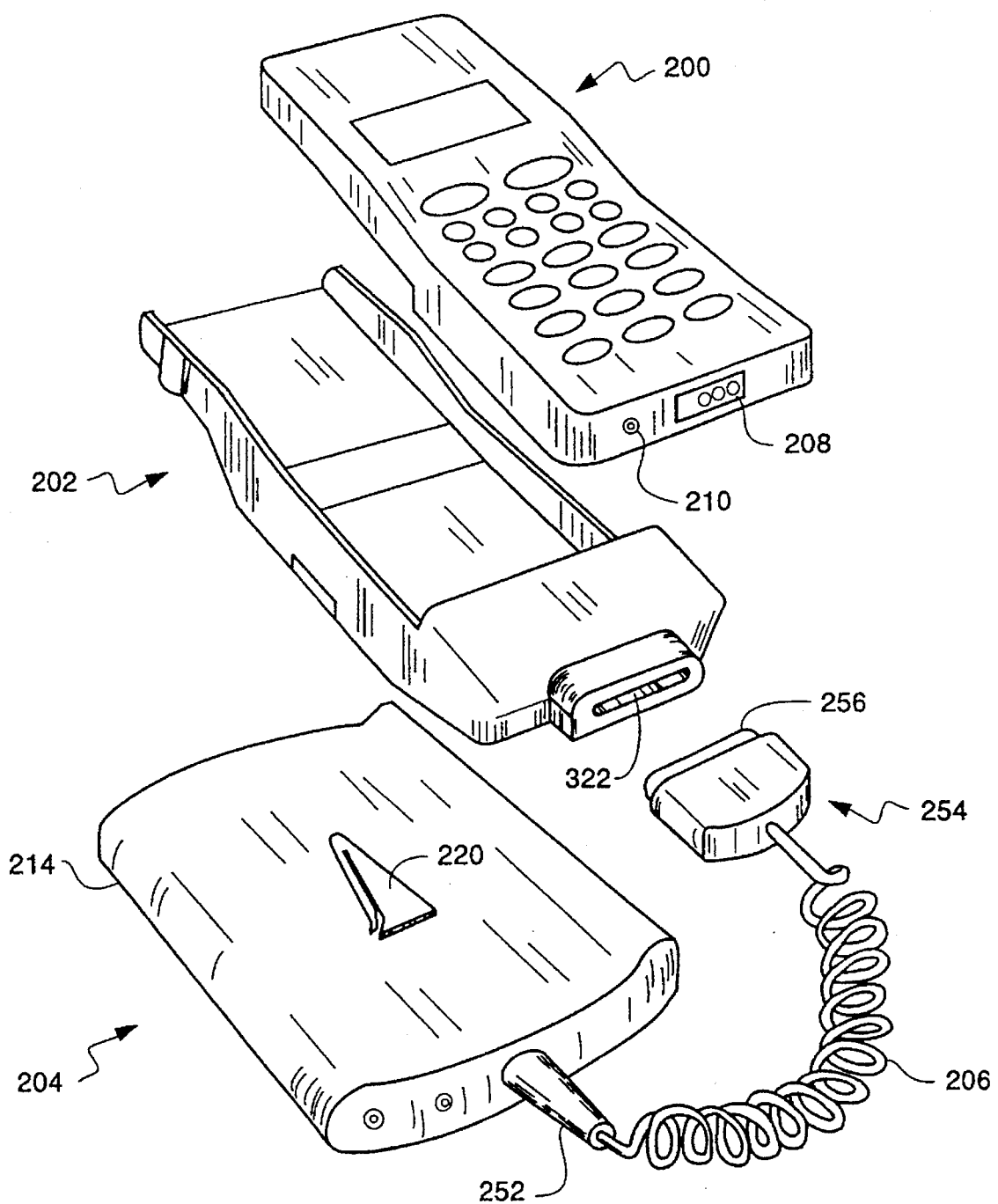
FIG. 14 is an exploded view of a universal connection system in accordance with a second embodiment of the present invention.

FIG. 14 is an exploded perspective view of this embodiment and illustrates a cellular telephone 200, a pocket adapter 202 for receiving a particular model of cellular telephone, a common base unit 204, and a cable 206 for providing a physical and electrical connection between the common base unit 204 and the pocket adapter 202. The cellular telephone 200 includes a connector 208 for establishing a physical and electrical connection with an external base unit and an RF connector 210 for establishing a connection with an external antenna.

Figure 18:
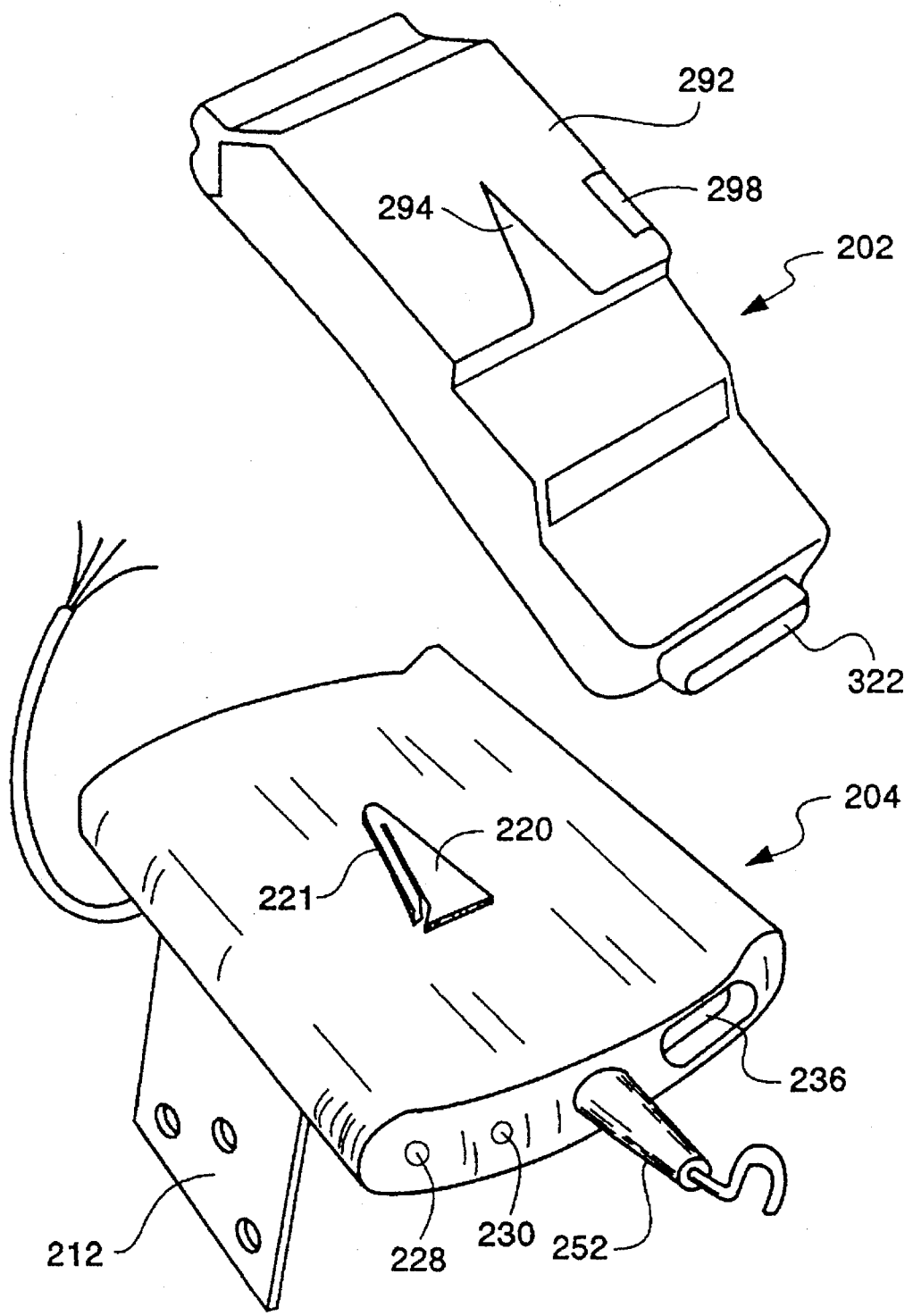
FIG. 18 is a perspective view of the base unit and the back of a pocket device in accordance with the present invention illustrating the physical interconnection between the pocket device and the base unit.

The base unit 204 may be permanently mounted in the passenger compartment of the automobile by means of a bracket 212, as illustrated in FIG. 18. However, it should be appreciated that a common base unit 204 in accordance with the present invention may be otherwise included in the automobile, including by means of a factory installed base unit which may be an integral part of the automobile's electrical system.

Figure 15:
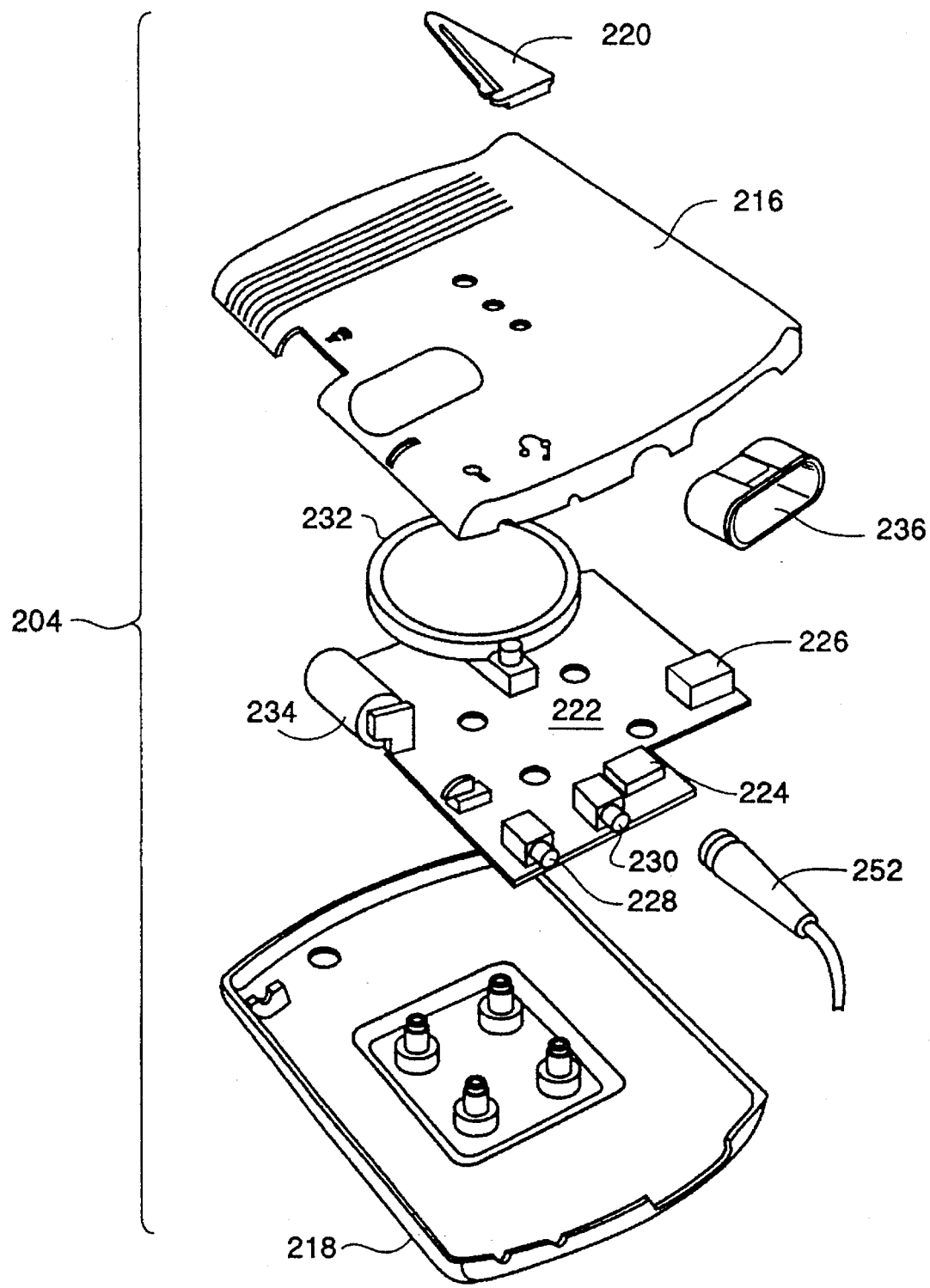
FIG. 15 is an exploded assembly view of a base unit in accordance with the second embodiment.

The common base unit 204 of the disclosed embodiment is capable of operating with any available cellular telephone. As illustrated in FIG. 15, the base unit 204 includes a housing 214 having a top section 216 connectable with a bottom section 218. A retaining clip 220 for securing the pocket adapter 202 to the housing 214 of the base unit 204 is mounted on the top section 216 of the housing 214. A circuit board 222 is mounted to the bottom section 218 of the housing and is disposed between the top section 216 and bottom section 218 when the base unit 204 is assembled.

The circuit board 222 includes a microprocessor 224 for managing the communications interface between the cellular telephone 200 and the common base unit 204. The circuit board 222 also includes a number of connectors for use with peripheral devices including an RJ-11 jack 226, a remote microphone jack 228, and a headset jack 230. A speaker 232 is connected to on the circuit board for hands-free operation of the cellular phone. The speaker volume may be adjusted using volume control knob 234 also mounted on the circuit board 222. The base unit 204 further includes a recessed cavity 236 for retaining a connector 256 when the base unit is not connected to a phone.

Figure 16:
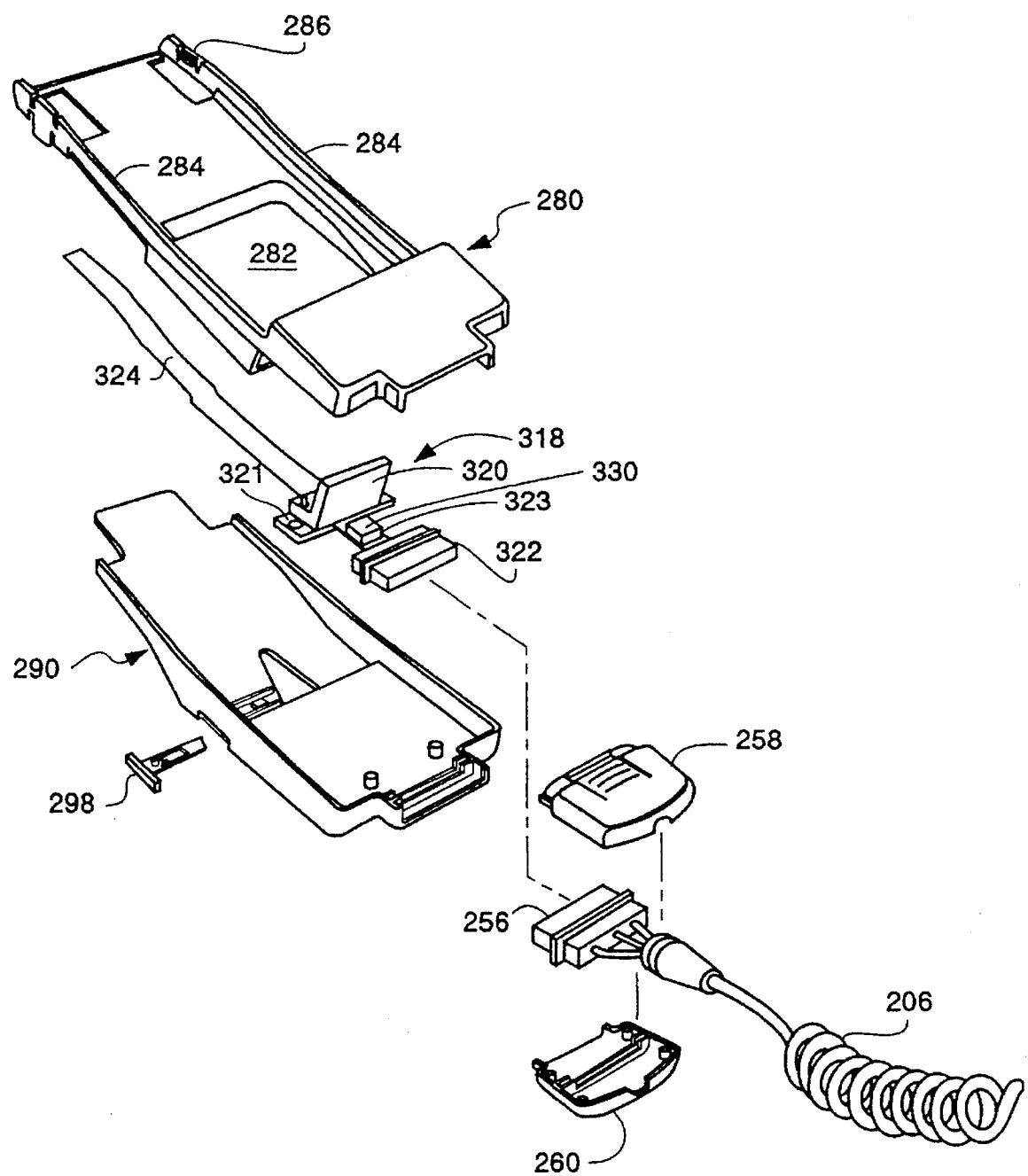
FIG. 16 is an exploded assembly view of a pocket adapter device in accordance with the second embodiment.

An electrical cable 206 for providing a connection between the base unit 204 and the pocket adapter 202 has a first end 252 securely connected to the base unit 204. Referring now to FIG. 16, it can be seen that the second end 254 of cable 206 includes the base unit connector 256 that mates with electrical interface 322 of pocket adapter 202. The base unit connector 256 is protected from damage by a shell having a top section 258 and a bottom section 260.

Referring to FIG. 16, it can also be seen that the pocket adapter 202 includes an upper shell 280 having a recessed surface 282 and side walls 284 for receiving cellular telephone 200. In the disclosed embodiment the recessed surface 282 is shaped to correspond to the back wall of the particular model of cellular telephone for which the pocket was designed. The upper shell 280 also includes a phone retainer latch 286 to facilitate securing the cellular telephone 200 in place within the pocket adapter 202. The pocket adapter 202 also includes a lower shell 290 interconnectable with the upper shell 280 to define a cavity therebetween.

Figure 19A:
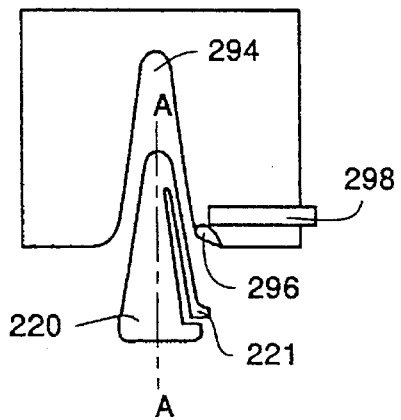
FIGS. 19A–19C illustrate the manner of interconnecting the pocket device to the base unit.
Figure 19B:
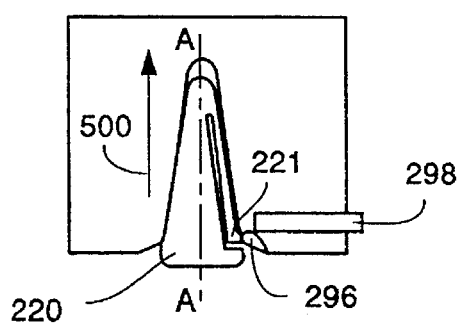
Figure 19C:
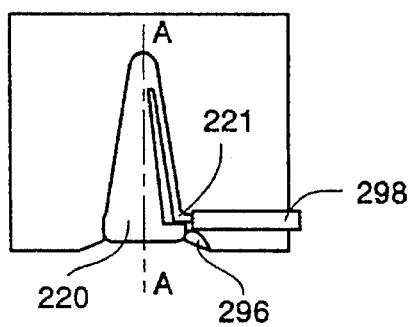

Referring to FIG. 18, it can be seen that a latching assembly 292 for securing the pocket adapter 202 to the retaining clip 220 of base unit 204 is disposed on the back side of pocket adapter 202. Operation of the latching assembly 292 and retaining clip 220 in securing the pocket adapter 202 to the common base 204 is illustrated in FIGS. 19A–19C. Referring to FIG. 19A, the latching assembly 292 includes a recessed groove or channel 294 for receiving the retaining clip 220. The retaining clip 220, which is formed from plastic or other such resilient material, includes a spring member 221 which is biased outwardly from an axis A—A drawn longitudinally through the center of retaining clip 220. As illustrated in FIG. 19B, when retaining clip 220 is inserted into recessed groove 294 in the direction indicated by arrow 500, spring member 221 is forced, against its bias, toward the axis A—A by catch member 296 located on the latching assembly 292. When retaining clip 220 is fully inserted into recessed groove 294, as indicated in FIG. 19C, spring member 221 passes catch member 296 and is allowed to snap back to its naturally biased position, thereby fixing retaining clip 220 within latching assembly 292 and securing pocket adapter 202 to the base unit 204.

Figure 24:
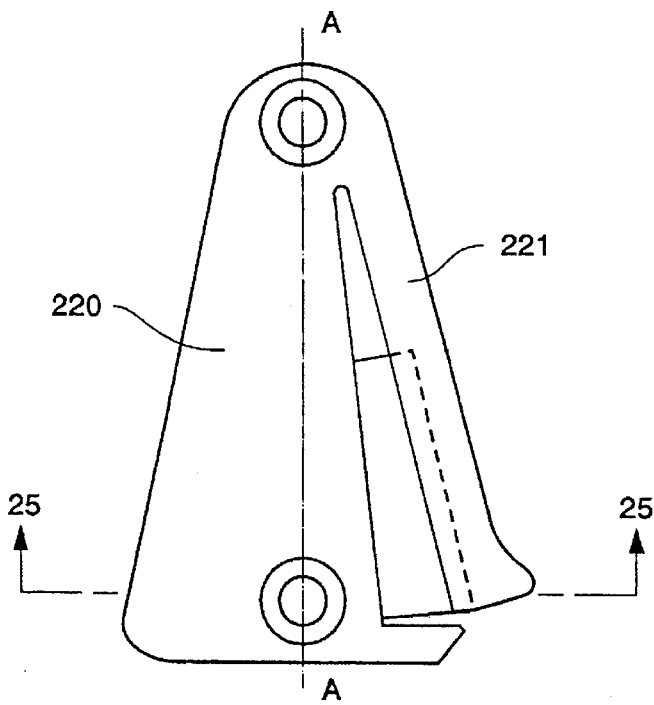
FIG. 24 is a frontal view of an embodiment of the retaining clip in accordance with the present invention.
Figure 25:
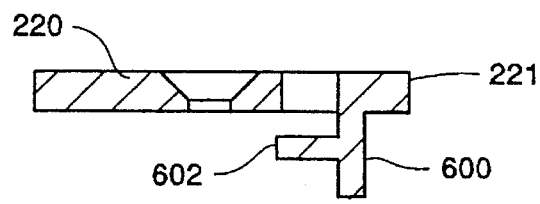
FIG. 25 is an elevation view of the retaining clip, taken along line 25–25 of FIG. 24.
Figure 26:
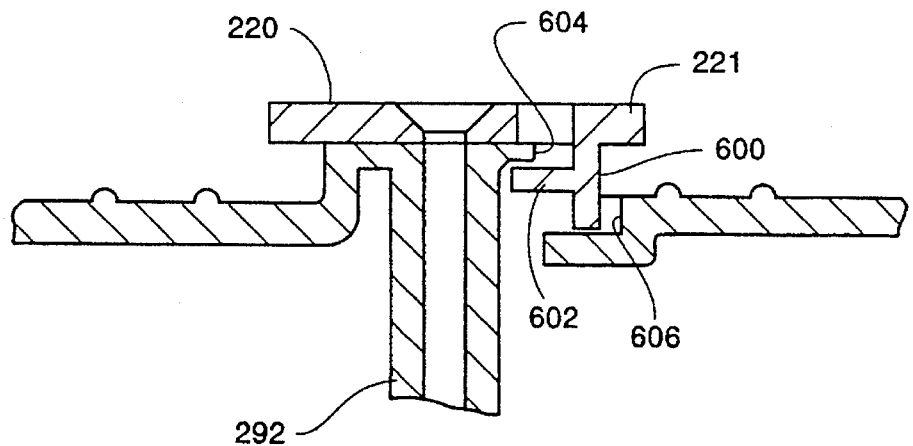
FIG. 26 is an elevation view illustrating the interconnection between the retaining clip illustrated in FIG. 24 and the pocket adapter of the present invention.

An embodiment of retaining clip 220 is shown in greater detail in FIGS. 24–26. As illustrated in FIGS. 24 and 25, a vertical flange 600 is part of the spring member 221 and extends from the spring member main body. A horizontal flange 602 extends laterally from the vertical flange 600. FIG. 26 is a cross sectional view illustrating the interconnection between retaining clip 220 and latching assembly 292 when retaining clip 220 is secured within latching assembly 292. As illustrated, horizontal flange 602 cooperates with lip 604 to inhibit upward deflection of spring member 221 and vertical flange 600 cooperates with lip 606 to inhibit lateral deflection of spring member 221 in a direction away from axis A-A. The cooperation between horizontal flange 602 and lip 606 and vertical flange 600 and lip 606 further facilitates securing retaining clip 220 within latching assembly 292.

Figure 20A:
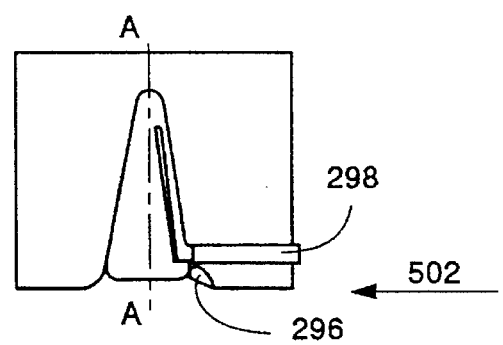
FIGS. 20A–20B illustrate the manner by which the pocket device is released from the base unit.
Figure 20B:
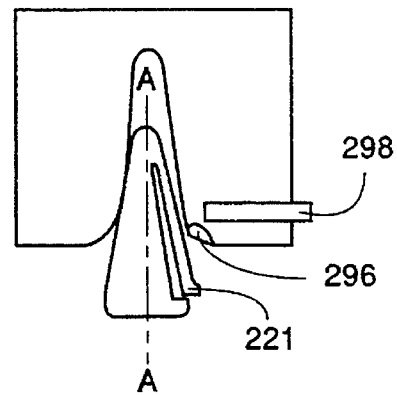
Figure 21:
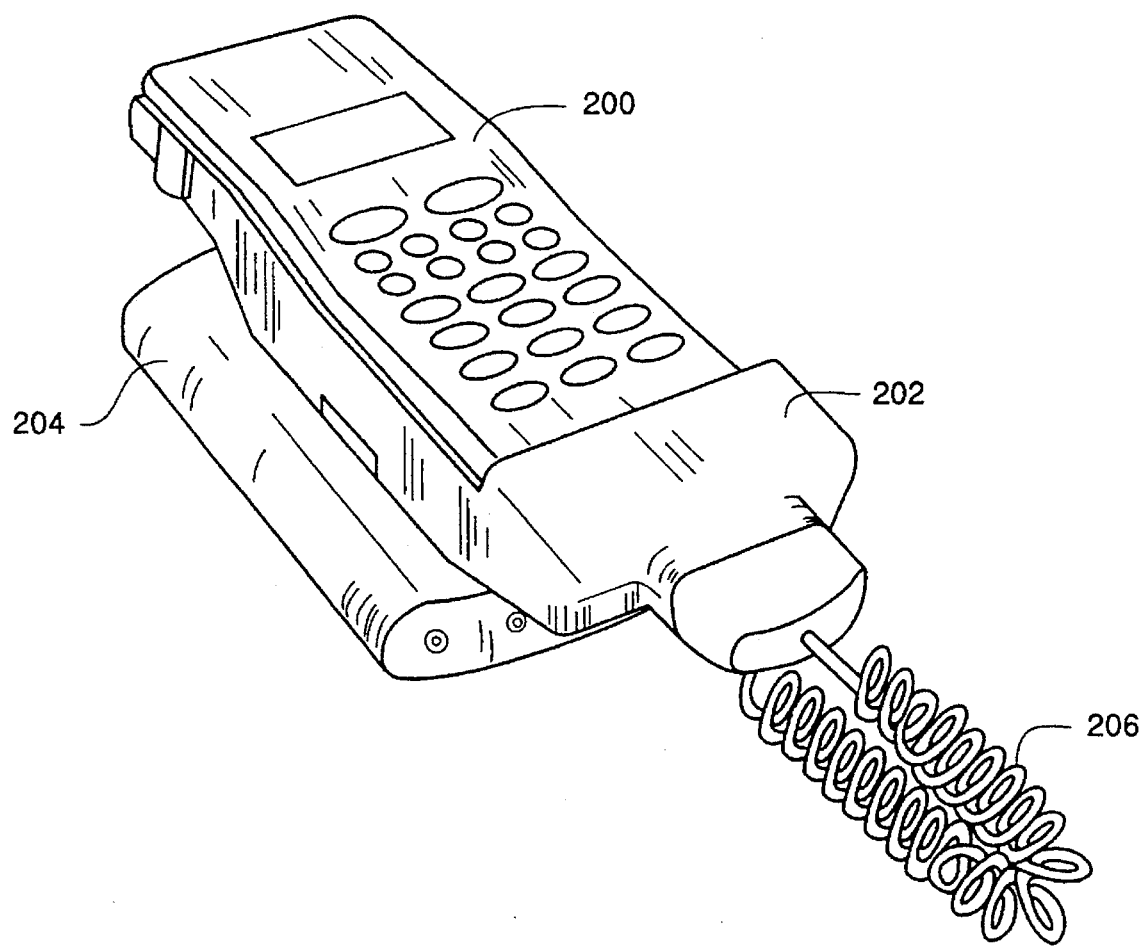
FIG. 21 is a perspective view illustrating a cellular telephone connected to the pocket device and the pocket device attached to the base unit.

The latching assembly 292 also includes a release mechanism 298 for releasing the pocket adapter 202 from base unit 204. Operation of the release mechanism 298 is illustrated in FIGS. 20A–20B. The release mechanism 298 is slidably engaged with the latching assembly 292 and positioned such that the release mechanism 298 is aligned with spring member 221 when retaining clip 220 is fixed within latching assembly 292. To release the pocket adapter 202 from the base unit 204, the release mechanism 298 is forced in the direction indicated by arrow 502 and the release mechanism 298 forces spring member 221 toward axis A—A. Once spring member 221 has cleared catch member 296, the retaining clip may be slid from the recessed groove 294, thereby removing the pocket adapter 202 from the base unit 204.

Referring again to FIGS. 16 and 17, interfacing hardware or a connection assembly 318 is disposed in the cavity between the upper shell 280 and the lower shell 290 of the pocket adapter 202. The connection assembly 318 is used to electrically interconnect the cellular telephone 200 to the electrical interface 322. The connection assembly 318 includes a connector housing 320, a connector mount 321 and a flexible cable conductor 323. The connector housing 320 has a number of conductor contacts 325 (FIG. 17), which may be a variety of connectors, including, for example, spring contacts and fixed connectors. The cable conductor 323, at a first end, is disposed between the connector housing 320 and the connector mount 321. The cable conductor 323 includes a number of conductors for providing electrical communication with the cellular telephone's connector 208 (FIG. 14). The electrical leads of the cable conductor 323 are connected to the electrical interface 322 having a predetermined pin configuration for communication with the base unit connector of cable 206. In one embodiment, the electrical interface includes sixteen pin assignments, which are designated as follows:

| Pin | Wire Designation |
| --- | --- |
| 1 | Phone Power Supply |
| 2 | Battery Charge |
| 3 | DC/Digital common |
| 4 | I/O 1 Serial data from phone/Control Option |
| 5 | I/O 2 Serial data to phone/Control Option |
| 6 | I/O 3 Control Option |
| 7 | I/O 4 Control Option |
| 8 | ROM Data |
| 9 | ROM Clock |
| 10 | Audio signal from phone (RX) |
| 11 | Audio signal to phone (TX) |
| 12 | Audio common |
| 13 | Reserved |
| 14 | Reserved |
| 15 | Reserved |
| 16 | Reserved |

Conducting wires 4–7 are used for various purposes depending on the particular cellular phone 200. Wires 13–16 are reserved for future digital uses, but can also be assigned as multi-purpose connections. The following identifies some typical assignments that might be made of wires 4–7:

| Wire | Phone 1 | Phone 2 | Phone 3 | Phone 4 | Phone 5 |
| --- | --- | --- | --- | --- | --- |
| 4 | Hang_up | Serial 1 | Serial 1 | HFVA_exist | Serial 1 |
| 5 | Speaker_Mute | Serial 2 | Serial 2 | HFVA_sw | Serial 2 |
| 6 | Ign_Sense | Serial 3 | Clock | Audio_enable | Clock |
| 7 | Pwr_status | | HFVA_exist | Pwr_status | |

Figure 17:
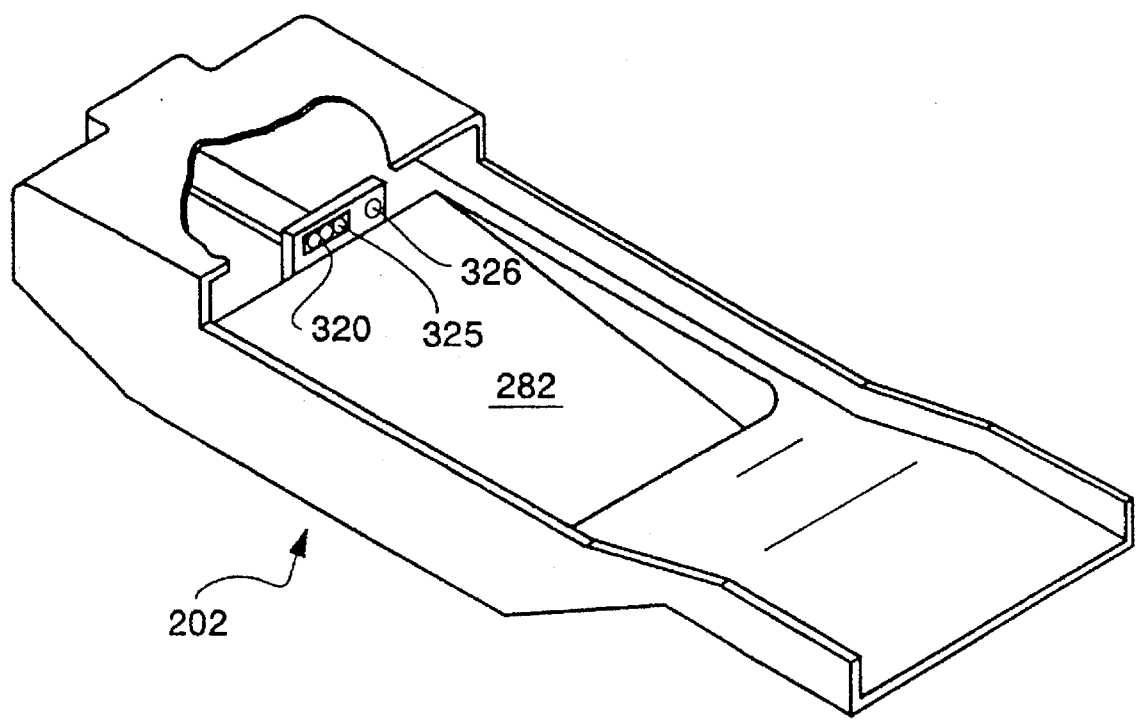
FIG. 17 is a perspective view of the pocket adapter device illustrating the connector for connecting the cellular telephone and the pocket device.

The connection assembly 318 also includes a coupler 324 for connecting to the antenna connector on the cellular telephone. If the cellular telephone has an external RF connector, such as connector 210 on cellular telephone 200, then the coupler 324 may be directly connected to the cellular telephone antenna via connector 326 (FIG. 17). However, if the cellular telephone does not have an external RF connector, the coupler 324 may also act to absorb power or energy from the cellular telephone antenna for transmitting or relaying the same to an external antenna. The coupler 324 is also connected to predetermined pins on the electrical interface 322 to provide an electrical connection to an external antenna for use with the cellular telephone 200.

As also seen in FIG. 16, a memory storage device, such as a non-volatile ROM chip 330, is provided to store information related to the particular model of cellular telephone 200 for use with the pocket device 202 including operating parameters such as the electrical characteristics and communications protocols associated with the cellular telephone 200. For example, the ROM chip 330 may store information regarding the voltage required to operate the cellular telephone or to charge its batteries. The ROM chip 330 may also include information regarding the features of the cellular telephone, such as whether the telephone has a serial communications port. When pocket adapter 202 is connected to base unit 204, the information on the ROM chip 330 may be downloaded to microprocessor 224 in base unit 204 to allow base unit 204 to establish operating parameters corresponding to those required by cellular telephone 200. As schematically illustrated in FIG. 16, the ROM chip 330 is located between the electrical interface 322 and the connector housing 320 and within the pocket device 202. In another embodiment, the ROM chip 330 is positioned within the cable that interconnects the particular cellular telephone and the base unit. This embodiment is useful where no pocket device is required, such as when all of the cellular phones or radios of interest have the same configured pin assignments so that no universal connector for each of these phones is required. In this case, the ROM chip 330 information is advantageously used, for example, in providing the correct battery charging voltage to the particular cellular telephone that is connected to the cable.

Figure 29:
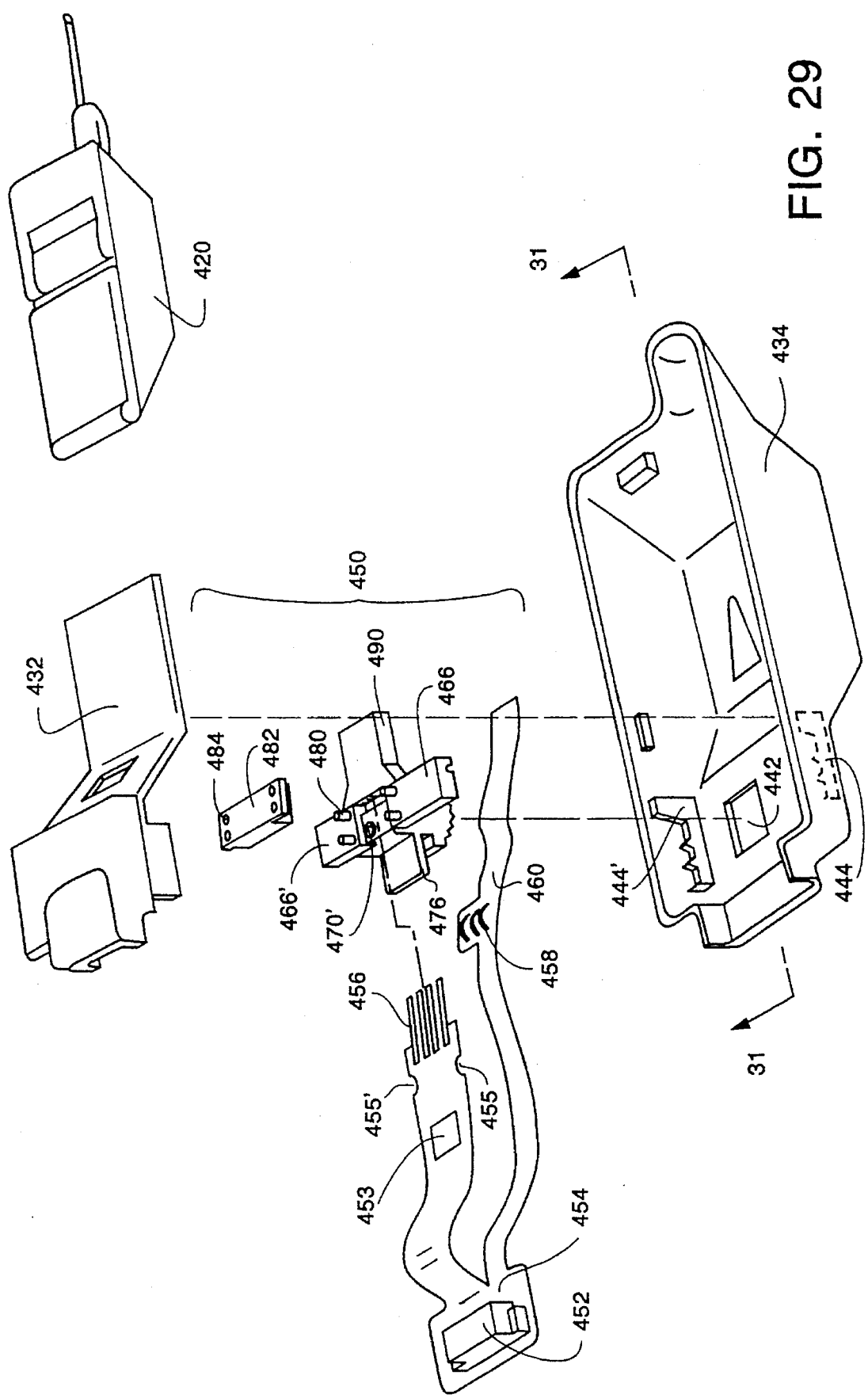
FIG. 29 is an exploded assembly view of a pocket adapter in accordance with the present invention which is particularly adapted to connect with a Motorola Flip Phone.
Figure 30:
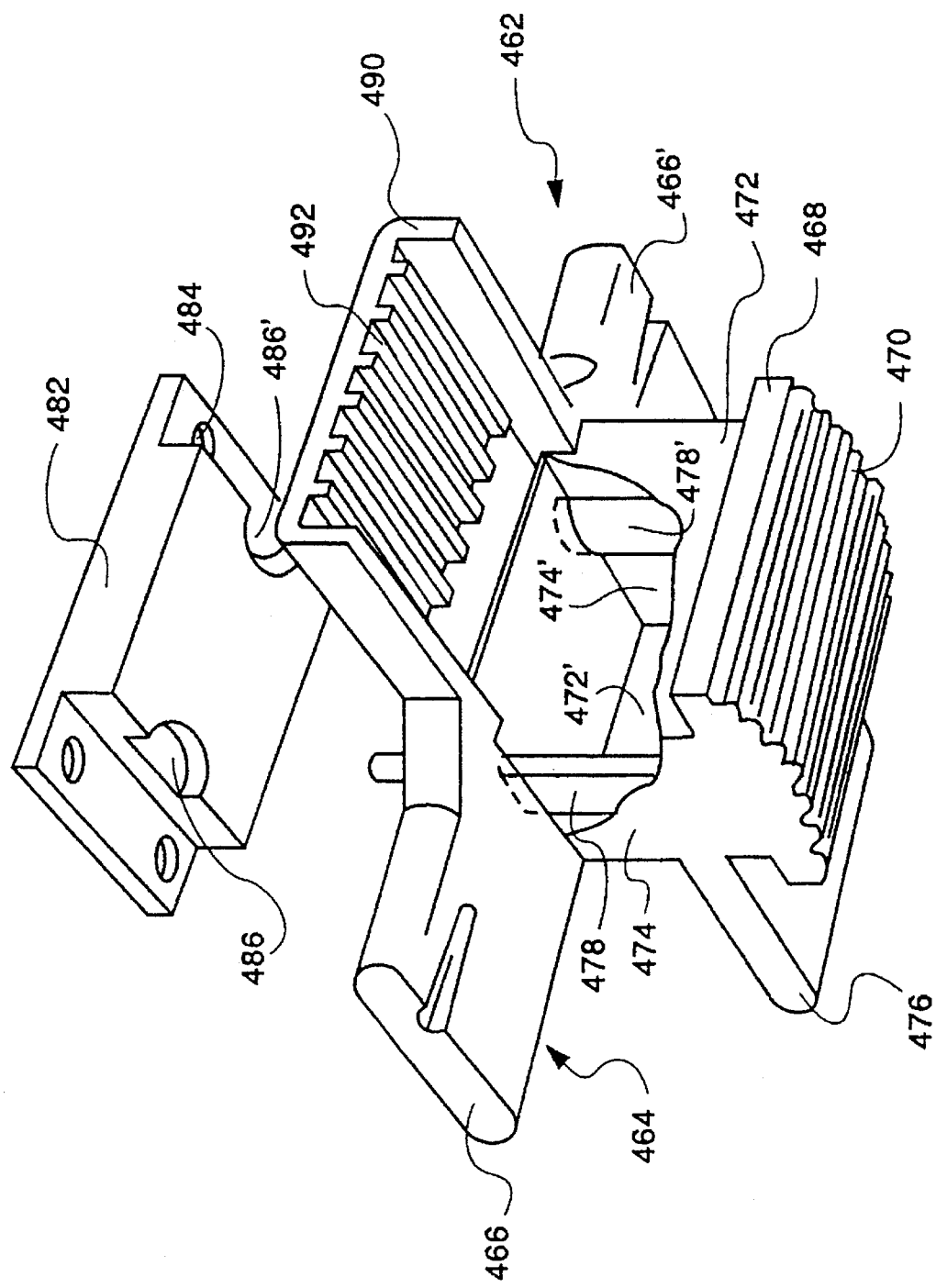
FIG. 30 is a perspective view of a slidable connector housing in accordance with the embodiment of FIG. 29.
Figure 31:
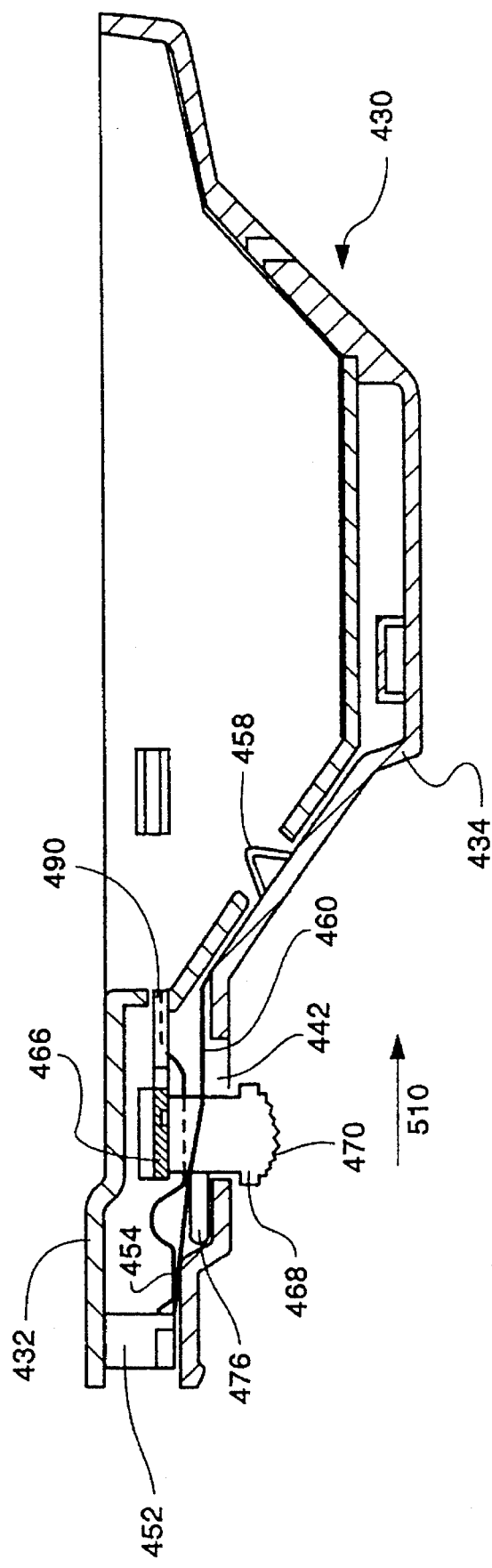
FIG. 31 is a cross-sectional view of the pocket adapter illustrated in FIG. 29 taken along a cross section Z—Z.

One embodiment of a connection assembly 450, in accordance with the present invention and illustrated in FIGS. 29–31, is particularly adapted for interconnection with a cellular telephone 420 available from Motorola. As illustrated in FIG. 29, the connection assembly 450 is disposed between an upper shell 432 and a lower shell 434 of pocket adapter 430. The pocket adapter 430 includes hardware for physically securing the cellular telephone within the adapter as previously described. Accordingly, the following discussion will focus on the electrical connection between the telephone and the base unit 204.

The connection assembly 450 includes an electrical interface 452 for establishing an electrical connection between the pocket adapter 430 and a common base unit 204. A flexible cable conductor 454 is connected to the electrical interface 452 at a first end and a portion of flexible cable 454 has a plurality of telephone connector contacts 456 at a second end for providing an electrical interconnection between the telephone 420 and the electrical interface 452. Disposed along the length of the flexible cable is a memory IC or ROM chip 453, which is comparable to the chip 330 of FIG. 16. Another portion of flexible cable 454 includes battery contacts 458 for establishing an electrical connection with the battery of the telephone 420 to charge the battery and an antenna coupler 460 which is able to absorb power from the cellular telephone's antenna and transmit the same to the electrical interface 452 for further transmittal to an external antenna.

The connection assembly 450 further includes a slidable connector housing 462, illustrated in perspective view in FIG. 30, having a base 464 including first and second lateral support members 466, 466'. A thumb-tab panel 468 having a knurled surface 470 is supported by opposing panels 472, 472' and 474, 474', which extend substantially perpendicularly from base 464. First and second strain relief posts 478, 478' are integrally molded with panels 474 and 474' to enhance the structural integrity of slidable connector housing 462. A cover member 476 extends substantially perpendicularly from panel 472. The slidable connector housing 462 further includes a male adapter 490 configured to mate with the electrical connector 422 of the telephone 420 and also has a plurality of retaining channels 492 for receiving the telephone connector contacts 456 of flexible cable 454.

As illustrated in FIG. 29, the upper surface of base 464 includes a plurality of connector posts 480 which interconnect with opposing holes 484 on connector mount 482 to secure connector mount 482 to connector housing 462. A portion of first and second strain relief posts 478, 478' also extend through base 464 to provide male connectors which mate with opposing female connectors 486, 486' on connector mount 482.

The connection assembly 450 and pocket adapter 430 are assembled by first securing the telephone connector contacts 456 within the retaining channels 492. Detents 455, 455' in flexible cable 454 interconnect with support posts 478, 478', respectively, to retain flexible cable 454 in position on base 464. Next, the connector mount 482 is secured to the base 464 of the slidable connector housing 462 to fix the flexible cable connector 454 in place with respect to the slidable connector housing 462. The disclosed embodiment utilizes a heat-setting procedure to secure the connector mount 482 to the slidable connector housing 462, however it will be appreciated that the closure block 482 could be attached by other fasteners including clamps, bolts or screws. Securing the flexible cable 454 to the slidable connector housing in this manner reduces the possiblity of a telephone connector contact 456 coming loose from cable 454 during use.

The slidable connector housing 462 is then positioned within lower shell 434, with thumb-tab 468 protruding through hole 442 in lower shell 440 of pocket adapter 430 and with support members 466, 466' disposed within channels 444 and 444' respectively. The battery contact spring clips 458 and antenna loop 460 are positioned on bottom shell 440 of pocket adapter 430 and the pocket adapter is assembled by 'snapping' the upper shell 432 and lower shell 434 together.

FIG. 31 is a cross sectional view of the assembled pocket adapter 430 taken along lines 31-31 of FIG. 29. A portion of flexible cable 454 is disposed along the surface of lower shell 434 to establish an electrical connection with battery contacts 458 and to provide an antenna lead 460. The portion of flexible cable 454 having a plurality of telephone connector contacts 456 is connected to male adapter 490. Electrical interface 452 is disposed at an end of pocket adapter 430 to facilitate interconnection with base unit connector 256 of cable 206 to establish a communications interface with a common base unit 204.

In use, the cellular phone 420 is physically disposed within the pocket adapter 430. The electrical connection is established by using the thumb-tab 468 to slide the connector housing 462 in the direction indicated by arrow 510, which moves the male adapter 490 into contact with the electrical connector 422 of the telephone 420. The pocket adapter 430 may then be connected to a universal base unit for use in accordance with the present invention as disclosed above. To remove the cellular telephone 420 from the pocket adapter 430 the user retracts the male adapter 490 from the telephone's electrical connector 422 by using the thumb-tab 460 to slide the connector housing 462 in a direction opposite to arrow 510. The phone 420 may then be physically removed from the pocket adapter 430.

In use, base unit 204 may be mounted in the passenger compartment of an automobile or other such vehicle and may be connected to a power source either directly or through an adapter connected to the cigarette lighter. The user first connects a cellular telephone to the pocket adapter 202 designed for use with the telephone. The pocket adapter is then connected to the base unit 204 using the cord 206. For hands-free operation, the pocket adapter 202 may be secured to the base unit 204 using retaining clip 220 and latching assembly 292 as described above. When the power to the base unit 204 is turned on, the information in the pocket adapter's ROM chip 330 is downloaded to the microprocessor 224 in the base unit 204. Based on this information, the base unit 204 establishes operating parameters which correspond to the requirements of telephone 200.

To interface the common base unit 204 with a second, different model of cellular telephone, the user need only select a pocket adapter for use with the second cellular telephone. When this adapter is connected to the base unit 204 and the power is turned on, the operating parameters and communications protocols for the second telephone are downloaded from the second telephone's pocket adapter to the microprocessor. Based on this information, the microprocessor 224 adjusts the operating parameters and communications protocols for operation of the second cellular telephone with the base unit 204.

Storing the cellular telephone's operational parameters and communication protocols on the pocket adapter's ROM chip provides a relatively inexpensive means for contributing to the modularity and expandability of the disclosed invention. Any pocket adapter in accordance with the present invention may be connected to any base unit in accordance with the present invention. Further, because the information is stored in memory which is remote from the base unit, the system may be expanded to include additional models of telephones without the need to reprogram additional protocols into the base unit. These advantages make the present invention particularly useful for automobile fleet managers, trucking companies, taxi companies, or other situations in which large numbers of persons have different cellular needs.

Figure 22:
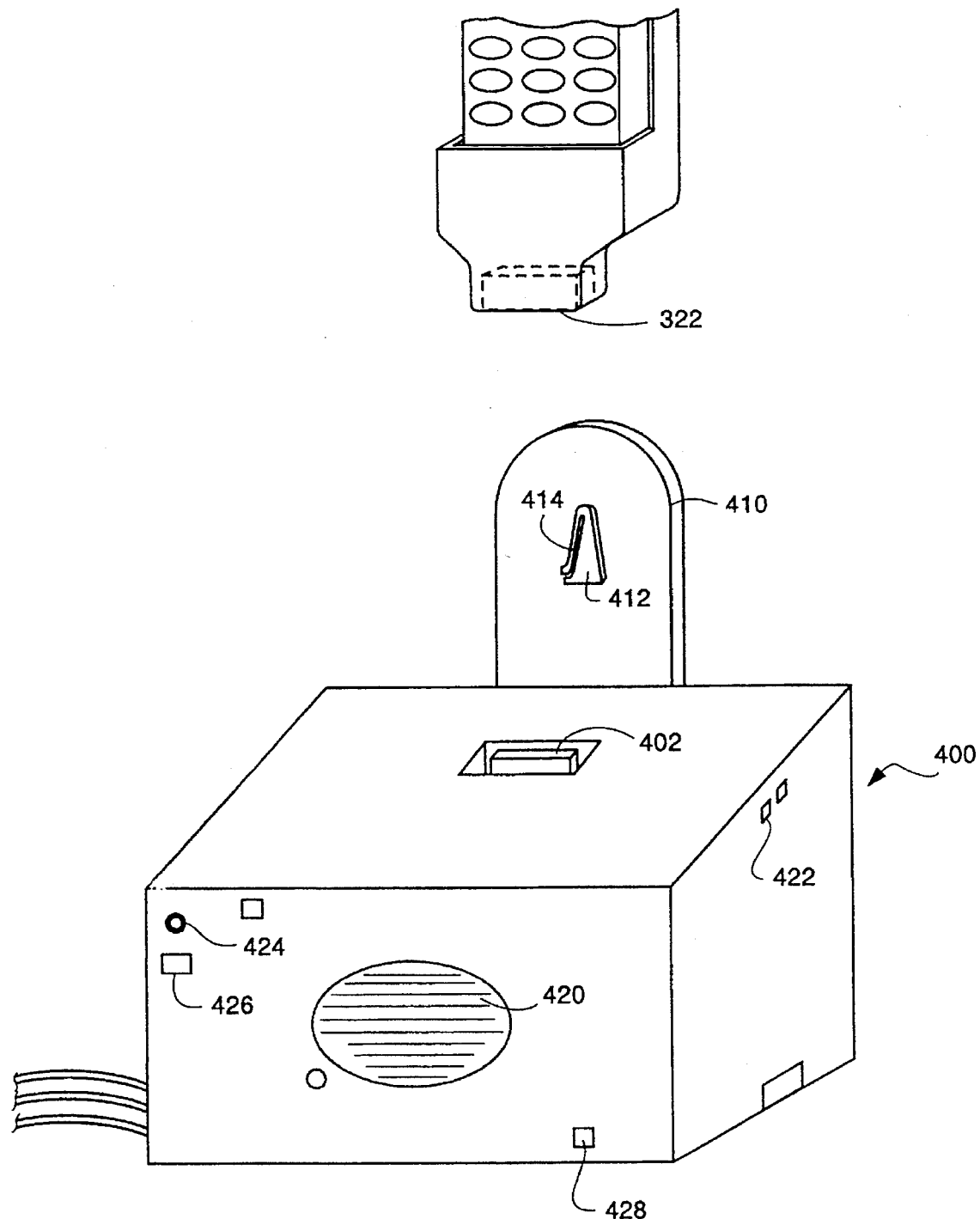
FIG. 22 is an illustration of a stationary base unit in accordance with the second embodiment of the present invention.
Figure 23:
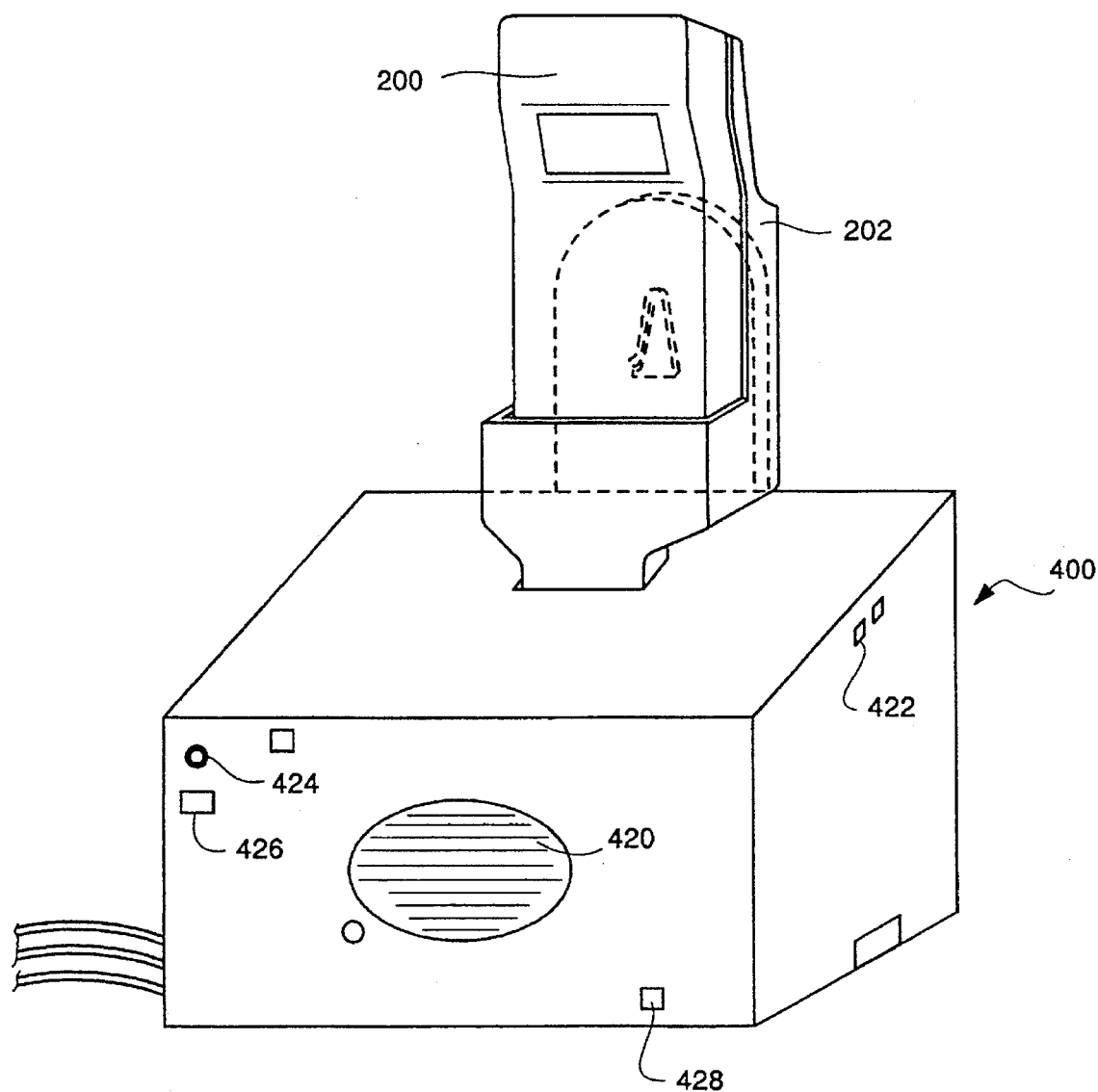
FIG. 23 is an illustration of the interconnection between a pocket device in accordance with the second embodiment of the present invention and a stationary base unit.

FIGS. 22–23 present an embodiment of base unit 400 particularly adapted for stationary use, such as on a desktop. Base unit 400 includes connector 402 which is configured to mate with outlet 322 of a pocket adapter 202 in accordance with the present invention. Base unit 400 further includes a support member 410 having a retaining clip 412 positioned to connect with latching assembly 292 of pocket adapter 202 when pocket adapter 202 is connected to base unit 400. Support member 410 facilitates securing pocket adapter 202 to base unit 400.

Once connected, a microprocessor in base unit 400 configures the system for operation with the selected cellular telephone by downloading the operating parameters from the ROM chip 330 in the pocket adapter 202. As with the mobile system, the base unit 400 may operate with different cellular telephones by simply replacing the cellular telephone and the corresponding pocket adapter.

The stationary base unit 400 performs substantially the same functions performed by the mobile base unit 204 discussed above. For example, base unit 400 may include a speaker 420 to facilitate hands-free operation of cellular telephone 200, an RJ-11 jack 422, a remote microphone jack 424, a headset jack 426 and a data communications port 428. The stationary base unit 400 may also have additional communications functions, such as an answering machine, built into the base unit. One of ordinary skill in the art will recognize that it would be obvious to add any number of such communications functions to the base unit of the disclosed embodiment.

Figure 27:
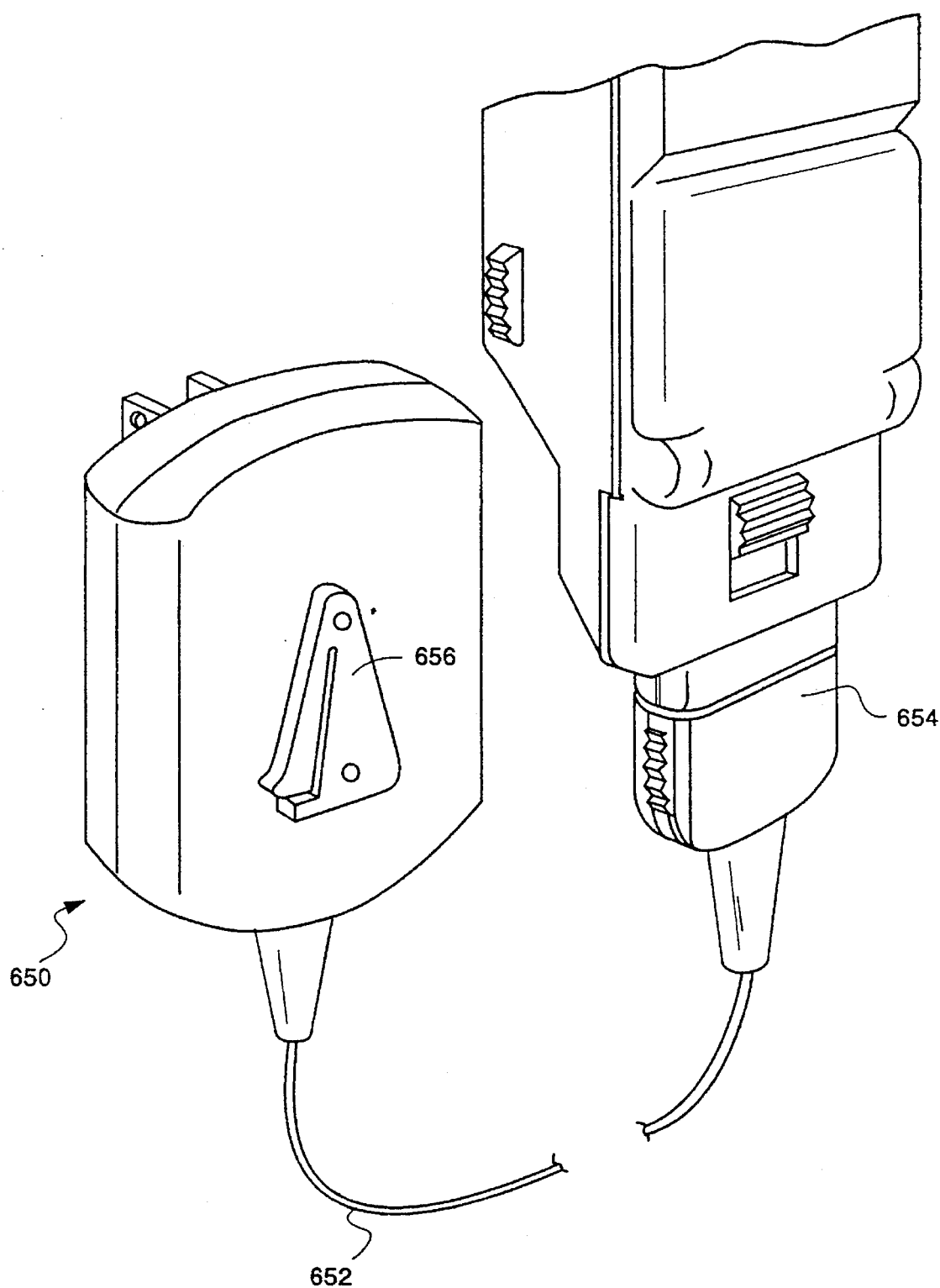
FIG. 27 is a perspective view of a wall mountable battery charging unit for use in charging phone batteries for each different make of phone.
Figure 28:
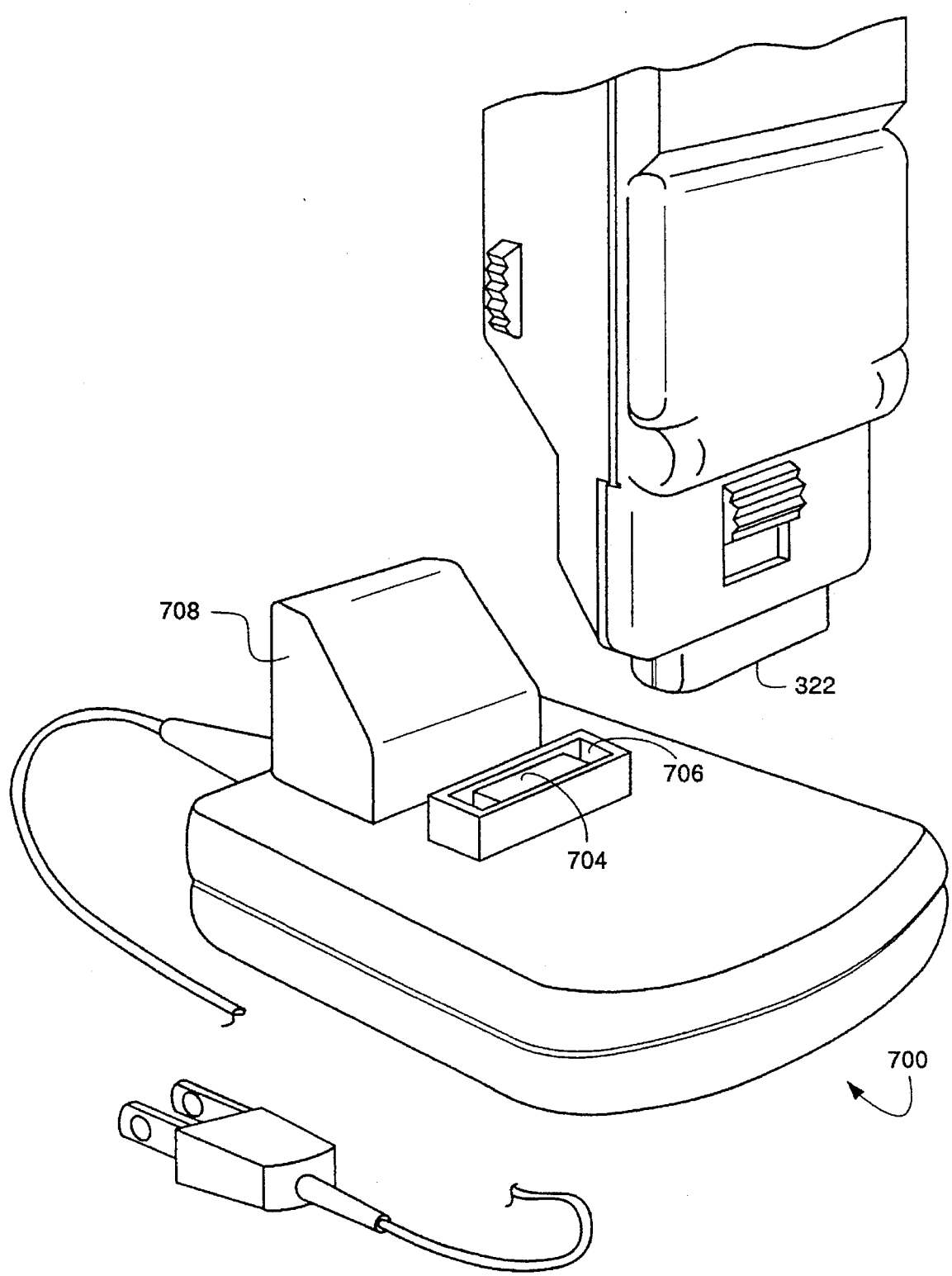
FIG. 28 is a perspective view of a battery charging unit for placement on a desk or other surface for use in charging phone batteries for each different make of phone.

FIGS. 27 and 28 illustrate embodiments of battery charger units for use with pocket devices in accordance with the present invention. The battery charger 650 of FIG. 27 is particularly adapted to plug directly into an AC outlet as would be found in any home or office. Battery charger 650 includes a cable 652 having a connector 654 that mates with electrical interface 322 of pocket adapter 202. Battery charger 650 further includes a retaining clip 656 for interconnection with the latching assembly 292 of pocket adapter 202 to secure pocket adapter 202 to battery charger 650. Retaining clip 656 works in substantially the same fashion as the retaining clip discussed above.

When pocket adapter 202 is electrically connected to battery charger 650 by cable 654 a microprocessor in battery charger 650 downloads information from ROM chip 330 and establishes appropriate electrical parameters for charging cellular phone 200 in accordance with the information received from ROM chip 330 in the same fashion as discussed above. In this manner, battery charger 650 may be used to charge any cellular phone for which there is a corresponding pocket adapter.

FIG. 28 is an illustration of a battery charger 700 which is adapted to be placed on a working surface, such as a desk, counter or the like. The battery charger of FIG. 28 includes an electrical cord 702 for plugging the charger into an outlet. A connector 704 that mates with electrical interface 322 of pocket adapter 202 is positioned with an aperture 706 on the top surface of battery charger 700. A support block 708 particularly adapted to mate with a surface of pocket adapter 202 may be positioned on battery charger 700, using conventional means, such as by snapping the block into preformed holes in battery charger 700, to help support pocket adapter 202.

In use, pocket adapter 202 is connected to battery charger 700 by interconnecting connector 704 and electrical interface 322. A microprocessor in battery charger 700 downloads information from ROM chip 330 and establishes the appropriate electrical parameters to charge cellular phone 200, as discussed above.

In another embodiment, the battery charger is physically located within the cable itself that interconnects the cellular telephone or radio and a base unit. This embodiment is particularly advantageous when no pocket device 202 is required, such as when a universal connector is not necessary because all cellular phones or radios of interest have a common connector.

It should be appreciated that the present invention is not limited to cellular transmission of voice data but also encompasses the transmission of other data across cellular telephone networks. For example, computer modems, facsimile machines, scanners, bar code readers, or other digital information processors may be connected to the base unit to provide for the transmission of digital data across the cellular link. Additionally, the pocket adapter of the present invention can also include an infrared (IR) receiver for use with telephones having an IR transmitter. The IR receiver is able to properly handle the IR signal from the telephone including the intelligence that is part of the IR signal.

While the exemplary preferred embodiments of the present invention are described herein with particularity, those having normal skill in the art will recognize various changes, modifications, additions and applications other than those specifically mentioned herein without departing from the spirit of this invention.

TABLE I

APPENDIX
For Vref 5 and Rfix 100000

| Step | Hex | Rprog | Vout |
|---|---|---|---|
| 1 | 0 | 1.43E+03 | 0.070 |
| 2 | 1 | 2.89E+03 | 0.141 |
| 3 | 2 | 4.40E+03 | 0.211 |
| 4 | 3 | 5.96E+03 | 0.281 |
| 5 | 4 | 7.56E+03 | 0.352 |
| 6 | 5 | 9.22E+03 | 0.422 |
| 7 | 6 | 1.09E+04 | 0.492 |
| 8 | 7 | 1.27E+04 | 0.563 |
| 9 | 8 | 1.45E+04 | 0.633 |
| 10 | 9 | 1.64E+04 | 0.703 |
| 11 | A | 1.83E+04 | 0.773 |
| 12 | B | 2.03E+04 | 0.844 |
| 13 | C | 2.24E+04 | 0.914 |
| 14 | D | 2.45E+04 | 0.984 |
| 15 | E | 2.67E+04 | 1.055 |
| 16 | F | 2.90E+04 | 1.125 |
| 17 | 10 | 3.14E+04 | 1.195 |
| 18 | 11 | 3.39E+04 | 1.266 |
| 19 | 12 | 3.65E+04 | 1.336 |
| 20 | 13 | 3.91E+04 | 1.406 |
| 21 | 14 | 4.19E+04 | 1.477 |
| 22 | 15 | 4.48E+04 | 1.547 |
| 23 | 16 | 4.78E+04 | 1.617 |
| 24 | 17 | 5.09E+04 | 1.688 |
| 25 | 18 | 5.42E+04 | 1.758 |
| 26 | 19 | 5.76E+04 | 1.828 |
| 27 | 1A | 6.12E+04 | 1.898 |
| 28 | 1B | 6.49E+04 | 1.969 |
| 29 | 1C | 6.89E+04 | 2.039 |
| 30 | 1D | 7.30E+04 | 2.109 |
| 31 | 1E | 7.73E+04 | 2.180 |
| 32 | 1F | 8.18E+04 | 2.250 |
| 33 | 20 | 8.66E+04 | 2.320 |
| 34 | 21 | 9.16E+04 | 2.391 |
| 35 | 22 | 9.69E+04 | 2.461 |
| 36 | 23 | 1.03E+05 | 2.531 |
| 37 | 24 | 1.08E+05 | 2.602 |
| 38 | 25 | 1.15E+05 | 2.672 |
| 39 | 26 | 1.21E+05 | 2.742 |
| 40 | 27 | 1.29E+05 | 2.813 |
| 41 | 28 | 1.36E+05 | 2.883 |
| 42 | 29 | 1.44E+05 | 2.953 |
| 43 | 2A | 1.53E+05 | 3.023 |
| 44 | 2B | 1.62E+05 | 3.094 |
| 45 | 2C | 1.72E+05 | 3.164 |
| 46 | 2D | 1.83E+05 | 3.234 |
| 47 | 2E | 1.95E+05 | 3.305 |
| 48 | 2F | 2.08E+05 | 3.375 |
| 49 | 30 | 2.22E+05 | 3.445 |
| 50 | 31 | 2.37E+05 | 3.516 |
| 51 | 32 | 2.54E+05 | 3.586 |
| 52 | 33 | 2.72E+05 | 3.656 |
| 53 | 34 | 2.93E+05 | 3.727 |
| 54 | 35 | 3.16E+05 | 3.797 |
| 55 | 36 | 3.41E+05 | 3.867 |
| 56 | 37 | 3.71E+05 | 3.938 |
| 57 | 38 | 4.04E+05 | 4.008 |
| 58 | 39 | 4.42E+05 | 4.078 |
| 59 | 3A | 4.87E+05 | 4.148 |
| 60 | 3B | 5.40E+05 | 4.219 |
| 61 | 3C | 6.03E+05 | 4.289 |
| 62 | 3D | 6.80E+05 | 4.359 |
| 63 | 3E | 7.77E+05 | 4.430 |
| 64 | 3F | 9.00E+05 | 4.500 |

What is claimed is:

1. An apparatus for use with a selected one of a plurality of cellular telephones, comprising:

a first pocket device having a body with a receiving section and an electrical interface, said receiving section for use in holding a first cellular telephone and having a first physical configuration including first dimensions, said electrical interface including a number of signal output conductors that have a predetermined physical arrangement;

a second pocket device having a body with a receiving section and an electrical interface, said receiving section for use in holding a second cellular telephone and having a second physical configuration including second dimensions that are different from said first physical configuration and said dimensions of said receiving section of said first pocket device and in which said receiving section of said second pocket device is unable to properly hold the first cellular telephone and said receiving section of said first pocket device is unable to properly hold the second cellular telephone, said electrical interface of said second pocket device including a number of signal output conductors that have a predetermined physical arrangement that is the same as said predetermined physical arrangement of said signal output conductors of said electrical interface of said first pocket device;

a common connector connectable to each of said electrical interfaces of each of said first and said second pocket devices, with said common connector being selected for connection to said electrical interface of said first pocket device using said predetermined physical arrangement of said signal output conductors;

a common device for providing at least a first predetermined function associated with a plurality of cellular telephones including the first cellular telephone and the second cellular telephone, said common device being detachably connected to said body of said first pocket device; and communication means for providing electrical communication between said common device and said electrical interface of said first pocket device using said common connector;

wherein when said body of said first pocket device, while properly holding the first cellular telephone, is detached from said common device, said number of signal output conductors are also detached with said body while said communication means maintains electrical communication between said first pocket device and said common device.

2. An apparatus, as claimed in claim 1, wherein:

one of said first pocket device and said common device includes a latching assembly and the other one of said common device and said first pocket device includes a retaining clip and in which said latching assembly and said retaining clip are joined together to detachably connect said body of said first pocket device and said common device together.

3. An apparatus, as claimed in claim 2, wherein: said retaining clip has a movable spring member and said latching assembly has a channel for receiving said spring member.

4. An apparatus, as claimed in claim 3, wherein:

said latching assembly includes a catch member adjacent to said channel for engaging said spring member.

5. An apparatus, as claimed in claim 2, wherein:

said latching assembly includes a movable release member.

6. An apparatus, as claimed in claim 2, wherein:

said latching assembly includes at least one lip for use in preventing movement of said spring member.

7. An apparatus, as claimed in claim 2, wherein:

said retaining clip has at least one flange for use in engaging a lip of said latching assembly to limit movement of said spring member.

8. An apparatus, as claimed in claim 1, wherein:

said first pocket device includes means for providing information related to an identity of the first cellular telephone.

9. An apparatus, as claimed in claim 8, wherein:

said means for providing information includes a memory device.

10. An apparatus, as claimed in claim 9, wherein:

said memory device provides function-related parameters that differ among different cellular telephones and said function-related parameters are used in identifying the first cellular telephone when it is connected to said first pocket device.

11. An apparatus, as claimed in claim 1, wherein:

said receiving section of said first pocket device includes a recessed area and first and second side walls for use in properly holding the first cellular telephone and said receiving section of said second pocket device includes a recessed area and first and second side walls for use in properly holding the second cellular telephone and in which said recessed area and first and second side walls of said second pocket device have a greater size than said recessed area and first and second side walls of said first pocket device.

12. An apparatus, as claimed in claim 1, wherein:

said first predetermined function includes charging a battery of the first cellular telephone.

13. An apparatus, as claimed in claim 12, wherein:

said common device is located at one of the following:

(a) adjacent to a wall mounted electrical outlet; and (b) supported on a laterally extending surface.

14. An apparatus, as claimed in claim 1, wherein:

said first pocket device includes a conductor cable communicating with said electrical interface and a connector housing having electrical contacts in communication with said conductor cable, said connector housing for electrically communicating with the first cellular telephone.

15. An apparatus, as claimed in claim 1, wherein:

said electrical interface of said first pocket device has a first set of input conductors having a first physical arrangement for use with the first cellular telephone and said electrical interface of said second pocket device has a second set of input conductors having a second physical arrangement different from said first physical arrangement for use with the second cellular telephone wherein said first set of input conductors communicates with the first cellular telephone and not the second cellular telephone and said second set of input conductors communicates with the second cellular telephone and not the first cellular telephone.

16. An apparatus, as claimed in claim 1, wherein:

said first pocket device includes means for storing information and said common device includes processing means and in which said information is controllable to be downloaded to said processing means.

17. An apparatus, as claimed in claim 1, wherein:

said first predetermined function includes charging a battery of the first cellular telephone and in which a source of power for charging the battery of the first cellular telephone is separate from each of said first pocket device, said second pocket device, said common device, said common connector and said communication means.

18. An apparatus, as claimed in claim 1, wherein:

said signal output conductors include at least one conductor electrically communicating with a speaker that is provided as part of said common device for hands-free operation of the first cellular telephone.

19. An apparatus, as claimed in claim 1, wherein:

said first pocket device includes an antenna coupler contained in said body and being different from any antenna separate from said first pocket device.

\* \* \* \* \*